(12) United States Patent
Larouche et al.

(10) Patent No.: US 11,198,179 B2
(45) Date of Patent: Dec. 14, 2021

(54) PLASMA ATOMIZATION METAL POWDER MANUFACTURING PROCESSES AND SYSTEM THEREFOR

(71) Applicant: AP&C ADVANCED POWDERS & COATINGS INC., Boisbriand (CA)

(72) Inventors: Frédéric Larouche, Île Bizard (CA); Matthieu Balmayer, Montréal (CA); Francis Trudeau-Lalonde, Montréal (CA)

(73) Assignee: AP&C ADVANCED POWDERS & COATING INC., Boisbriand (CA)

( * ) Notice: Subject to any disclaimer, the term of this patent is extended or adjusted under 35 U.S.C. 154(b) by 0 days.

(21) Appl. No.: 15/745,136

(22) PCT Filed: Jul. 6, 2016

(86) PCT No.: PCT/CA2016/050786
§ 371 (c)(1),
(2) Date: Jan. 16, 2018

(87) PCT Pub. No.: WO2017/011900
PCT Pub. Date: Jan. 26, 2017

(65) Prior Publication Data
US 2018/0214956 A1 Aug. 2, 2018

Related U.S. Application Data

(60) Provisional application No. 62/193,622, filed on Jul. 17, 2015, provisional application No. 62/251,476, filed on Nov. 5, 2015.

(51) Int. Cl.
*B22F 9/08* (2006.01)
*B22F 9/14* (2006.01)
(Continued)

(52) U.S. Cl.
CPC ............ *B22F 9/082* (2013.01); *B22F 1/0014* (2013.01); *B22F 9/08* (2013.01); *B22F 9/12* (2013.01);
(Continued)

(58) Field of Classification Search
None
See application file for complete search history.

(56) References Cited

U.S. PATENT DOCUMENTS 3,041,672 A 7/1962 Lyle
3,172,753 A 3/1965 Walsh
(Continued)

FOREIGN PATENT DOCUMENTS

CA 2383861 3/2001
CA 2399581 8/2001
(Continued)

OTHER PUBLICATIONS

Choquet et al. Electric welding arc modeling with the solver OpenFOAM—a comparison of different electromagnetic models. Uploaded Feb. 5, 2015. (Year: 2015).*
(Continued)

*Primary Examiner* — Paul A Wartalowicz
*Assistant Examiner* — Stephani Hill
(74) *Attorney, Agent, or Firm* — Dority & Manning, P.A.

(57) ABSTRACT

A plasma atomization metal powder manufacturing process includes providing a heated metal source and contacting the heated metal source with the plasma of at least one plasma source under conditions effective for causing atomization of the heated metal source. The atomization may be carried out using a gas to metal ratio of less than about 20, thereby obtaining a raw metal powder having a 0-106 μm particle size distribution yield of at least 80%. The process may further include aligning the heated metal source with the
(Continued)

plasma of at least one plasma source. An atomizing system may include an alignment system positioned upstream of the plasma source and adapted to adjust an orientation of the metal source relative to the at least one plasma source.

35 Claims, 11 Drawing Sheets

(51) Int. Cl.
*B22F 9/12* (2006.01)
*B22F 1/00* (2006.01)
*C22C 1/04* (2006.01)

(52) U.S. Cl.
CPC .............. *B22F 9/14* (2013.01); *C22C 1/0416* (2013.01); *C22C 1/0458* (2013.01); *B22F 2009/0836* (2013.01); *B22F 2009/0892* (2013.01); *B22F 2202/13* (2013.01); *B22F 2304/10* (2013.01); *B22F 2998/00* (2013.01)

(56) References Cited

U.S. PATENT DOCUMENTS

| | | | |
|---|---|---|---|
| 3,347,698 A | 10/1967 | Ingham, Jr. | |
| 3,891,824 A | 6/1975 | Essers et al. | |
| 3,944,412 A | 3/1976 | Liu | |
| 4,022,872 A | 5/1977 | Carson et al. | |
| 4,095,081 A | 6/1978 | Ashman | |
| 4,105,437 A | 8/1978 | Liu | |
| 4,374,075 A | 2/1983 | Yolton et al. | |
| 4,519,835 A * | 5/1985 | Gauvin | B01J 19/088 75/10.19 |
| 4,544,404 A | 10/1985 | Yolton et al. | |
| 4,788,394 A | 11/1988 | Vanneste et al. | |
| 4,788,402 A * | 11/1988 | Browning | B05B 7/224 219/121.47 |
| 4,982,410 A | 1/1991 | Mustoe et al. | |
| 5,114,471 A | 5/1992 | Johnson et al. | |
| 5,120,352 A | 6/1992 | Jackson et al. | |
| 5,147,448 A | 9/1992 | Roberts et al. | |
| 5,176,938 A | 1/1993 | Wallstén et al. | |
| 5,200,595 A | 4/1993 | Boulos et al. | |
| 5,213,610 A | 5/1993 | Yolton et al. | |
| 5,277,705 A | 1/1994 | Anderson et al. | |
| 5,284,329 A | 2/1994 | Hohman et al. | |
| 5,294,242 A | 3/1994 | Zurecki et al. | |
| 5,296,667 A * | 3/1994 | Marantz | B05B 7/224 219/121.47 |
| 5,340,377 A | 8/1994 | Accary et al. | |
| 5,357,075 A | 10/1994 | Muehlberger | |
| 5,368,657 A | 11/1994 | Anderson et al. | |
| 5,372,629 A | 12/1994 | Anderson et al. | |
| 5,442,153 A | 8/1995 | Marantz et al. | |
| 5,480,470 A * | 1/1996 | Miller | B22F 9/082 264/12 |
| 5,529,292 A | 6/1996 | Accary et al. | |
| 5,707,419 A * | 1/1998 | Tsantrizos | B01J 19/088 264/10 |
| 5,808,270 A | 9/1998 | Marantz et al. | |
| 5,855,642 A | 1/1999 | Miller et al. | |
| 5,932,346 A | 8/1999 | Kent et al. | |
| 5,935,461 A | 8/1999 | Witherspoon et al. | |
| 5,939,151 A | 8/1999 | Prichard et al. | |
| 5,989,648 A | 11/1999 | Phillips | |
| 6,142,382 A | 11/2000 | Ting et al. | |
| 6,365,867 B1 | 4/2002 | Hooper | |
| 6,398,125 B1 | 6/2002 | Liu et al. | |
| 6,444,009 B1 | 9/2002 | Liu et al. | |
| 6,582,763 B1 | 6/2003 | Nishimura et al. | |
| 6,693,264 B2 | 2/2004 | Anderhuber et al. | |
| 6,744,006 B2 | 6/2004 | Johnson et al. | |
| 6,780,219 B2 | 8/2004 | Singh et al. | |
| 7,022,155 B2 | 4/2006 | Deegan et al. | |
| 7,131,597 B2 | 11/2006 | Scattergood | |
| 7,198,657 B2 | 4/2007 | Tornberg | |
| 7,431,750 B2 | 10/2008 | Liao et al. | |
| 7,547,346 B2 | 6/2009 | Sekine | |
| 7,572,315 B2 | 8/2009 | Boulos et al. | |
| 7,582,135 B2 | 9/2009 | Nakamura et al. | |
| 7,628,838 B2 * | 12/2009 | Walter | B01J 2/04 75/338 |
| 7,678,339 B2 | 3/2010 | Wira | |
| 7,753,989 B2 | 7/2010 | Ernst et al. | |
| 7,803,235 B2 | 9/2010 | Venigalla | |
| 7,931,836 B2 | 4/2011 | Xie et al. | |
| 7,943,084 B1 | 5/2011 | Johnson et al. | |
| 7,967,891 B2 | 6/2011 | Paserin et al. | |
| 7,981,190 B2 | 7/2011 | Nakamura et al. | |
| 8,518,358 B2 | 8/2013 | Xie et al. | |
| 8,859,931 B2 | 10/2014 | Boulos et al. | |
| 9,650,309 B2 | 5/2017 | Anderson et al. | |
| 9,718,131 B2 | 8/2017 | Boulos et al. | |
| 9,751,129 B2 | 9/2017 | Boulos et al. | |
| 9,833,837 B2 | 12/2017 | Heidloff et al. | |
| 9,956,615 B2 | 5/2018 | Hanusiak et al. | |
| 9,981,315 B2 | 5/2018 | Rieken et al. | |
| 2001/0054784 A1 * | 12/2001 | Tornberg | B22F 9/082 266/202 |
| 2002/0125591 A1 | 9/2002 | Jaynes et al. | |
| 2002/0168466 A1 | 11/2002 | Tapphorn et al. | |
| 2003/0080097 A1 | 5/2003 | Boulos et al. | |
| 2005/0028642 A1 | 2/2005 | Mooney et al. | |
| 2005/0050993 A1 | 3/2005 | Scattergood | |
| 2005/0118090 A1 | 6/2005 | Shaffer et al. | |
| 2007/0130656 A1 * | 6/2007 | Boulos | B01J 2/04 423/138 |
| 2009/0260481 A1 | 10/2009 | Boulos et al. | |
| 2010/0139815 A1 | 6/2010 | Pandey | |
| 2011/0253815 A1 * | 10/2011 | Voice | B22F 9/04 241/15 |
| 2012/0160813 A1 * | 6/2012 | Kowalsky | B05B 7/224 219/121.47 |
| 2012/0261390 A1 | 10/2012 | Boulos et al. | |
| 2012/0325051 A1 * | 12/2012 | Watson | B22F 9/002 75/338 |
| 2013/0030205 A1 | 1/2013 | Jackson et al. | |
| 2013/0255443 A1 | 10/2013 | Han et al. | |
| 2013/0255445 A1 | 10/2013 | Boulos et al. | |
| 2013/0306205 A1 | 11/2013 | Anderson et al. | |
| 2014/0373679 A1 | 12/2014 | Heidloff et al. | |
| 2015/0284534 A1 | 10/2015 | Thierry et al. | |
| 2016/0323987 A1 | 11/2016 | Boulos et al. | |
| 2016/0381777 A1 | 12/2016 | Boulos et al. | |
| 2017/0106448 A1 | 4/2017 | Boulos et al. | |
| 2017/0209923 A1 | 7/2017 | Giovannetti et al. | |
| 2017/0211167 A1 | 7/2017 | Li et al. | |
| 2017/0326649 A1 | 11/2017 | Boulos et al. | |
| 2018/0169763 A1 * | 6/2018 | Dorval Dion | C21D 9/60 |

FOREIGN PATENT DOCUMENTS

| | | |
|---|---|---|
| CA | 2538239 | 3/2005 |
| CA | 2912282 | 3/2015 |
| CA | 2912282 | 9/2015 |
| CN | 1709585 A | 12/2005 |
| CN | 103223492 A | 7/2013 |
| CN | 103433499 A | 12/2013 |
| CN | 103752822 A | 4/2014 |
| CN | 103846447 A | 6/2014 |
| CN | 104894483 A | 9/2015 |
| EP | 3172000 A1 | 5/2017 |
| EP | 3302855 A1 | 4/2018 |
| JP | S49-25554 * | 7/1974 |
| JP | S49025554 B | 7/1974 |
| JP | 2001/226704 A | 8/2001 |
| JP | 2004/091843 A | 3/2004 |
| JP | 2004091843 | 3/2004 |
| JP | 2010/018825 A | 1/2010 |
| JP | 2010019608 | 1/2010 |
| JP | 2011/089212 A | 5/2011 |
| JP | 2018/524478 A | 8/2018 |

(56) References Cited

FOREIGN PATENT DOCUMENTS

| KR | 10-2013-0043599 | * | 4/2013 |
|----|---|---|---|
| WO | 8705548 | | 9/1987 |
| WO | 2011054113 | | 5/2011 |
| WO | WO2015/135075 | | 9/2015 |
| WO | 2016191854 | | 12/2016 |

OTHER PUBLICATIONS

Antony et al. Processes for production of high-purity metal powders. JOM. Mar. 2003. 14-18. (Year: 2003).*
Smagorinski et al. Production of spherical titanium powder by plasma atomization. Advances in Powder Metallurgy & Particulate Materials (2002) 3/248-3/260. (Year: 2002).*
Plasma atomization gives unique spherical powders. MPR Nov. 1997. 34-37 (Year: 1997).*
Notomi et al. Correlation between particle velocity and diameter in plasma spraying of nickel-chromium alloy. Therm Spray: Int. Adv. Coat. Technol., Proc. Int. Them. Spray Conf., 13th (1992), 349-353. Editor C. Berndt. ASM International: Materials Park. Ohio. (Year: 1992).*
KR 10-2013-0043599 machine translation (Year: 2013).*
Application No. KR 10-2013-0145639 patent document and machine translation (Year: 2015).*
JP S49-025554 machine translation (Year: 1974).*
Simonelli. "Microstructure and mechanical properties of Ti-6AI-4V fabricated by selective laser melting." TMS 2012 Supplemental Proceedings, vol. 1, 863-870. (Year: 2012).*
Petrunichev et al. "Coalescence and structure of particles in the plasma atomizing of wire" Fizika I Khimiya Obrabotki Materialov (1979) (6) 996-100. STN abstract. (Year: 1979).*
Tanaka et al., "Active Hydroxyl Groups on Surface Oxide Film of Titanium, 316L Stainless Steel, and Cobalt-Chromium-Molybdenum Alloy and Its Effect on the Immobilization of Poly(Ethylene Glycol)", Materials Transactions, vol. 49, No. 4, pp. 805 to 811, Mar. 5, 2008.
BIOTIP, "Injection Moulding of Titanium Powders for Biomedical Applications", Project Craft 017991, Jun. 20, 2017.
Boulos, "Thermal Plasma Processing", IEEE Transactions on Plasma Science, vol. 19, No. 6, Dec. 1991.
Sumper et al., "Electrical energy efficiency: technologies and applications", Library of Congress Cataloging-in-Publication Date, 2012.
Nasa Tech Brief, "Advances in Induction-Heated Plasma Torch Technology", Lewis Research Center, May 1972.
Raymor AP&C: Leading the way with plasma atomised Ti spherical powders for MIM, vol. 5, No. 4, Dec. 2011—Powder Injection Moulding International.
Soucy et al., "Heat and mass transfer during in-flight nitridation of molybdenum disilicide powder in an induction plasma reactor", Materials Science and Engineering A300 (2001) 226-234.
"Ti-6AI-4V (45-106 m m)" specification sheet, AP&C (2014).
Maher I. Boulos, "Induction Plasma Synthesis and Processing of Nanostructured Materials", M. Boulos, IMP2002, Miyagi, Nov. 27-29, 2002.
Huang et al., "The Manufacture of Spherical Titanium Alloy Powder in Plasma", Materials Science and Engineering 62 (2014) 012011.
https://en.wikipedia.org/wiki/Induction_plasma, [retrieved on Jun. 11, 2018].
Jiang et al., "Reactive deposition of tungsten and titanium carbides by induction plasma", J. Materials science, 30, 2325-2329 (1995).
Jiang et al., "Induction Plasma Reactive Deposition of Tungsten Carbide from Tungsten Metal Powder", Acta Metallurgica Sinca (English Letters) 14, 5, 350-358, Oct. 2001.
Jiang et al., "Effect of process parameters on induction plasma reactive deposition of tungsten carbide from tungsten metal powder", Trans. Nonferrous Met. Soc. China, 11, 639-643, Oct. 2001.
Kouprine et al., "Polymer-like C:H Thin Film Coating of Nanopowders in Capacitively Coupled RF Discharge", Plasma Chemistry, Plasma Processing, 24, 2, 189-216, Jun. 2004.

Li et al., "Effect of grain size reduction on high temperature oxidation of binary two-phase alloys", Trans. Nonferrous Met. Soc. China, Oct. 2001.
McCracken et al., "Production of a new Plasma Spheroidised (PS) titanium powder", Powder Injection Molding International, vol. 6, No. 3 (2012) 78-80.
Vert R., "High quality powder manufacturing and recycling by Induction Plasma Technology", Presented at Euro PM2015 Congress & Exhibition (Oct. 4-7, 2015, Reims, France).
McCracken et al., "Production of fine titanium powders via the Hybride-Dehydride (HDH) process", Powder Injection Moulding International, vol. 2 No. 2 (Jun. 2008).
Vert et al., "Induction plasma technology applied to powder manufacturing: example of titanium-based materials", 22nd International Symposium on Plasma Chemistry, Jul. 5-10, 2015, Antwerp, Belgium.
"Prior Art filed under Section 34.1 of the Patent Act", for CA 3 003 502, published on May 4, 2017.
English Translation—Machine Translation of JP2010019608(A), "Meryllium Material Filling Body, and Molding Method of Beryllium Material Filling Body", published on Jan. 28, 2010.
ALD Vacuum Technologies GmbH, "Metal Powder Technology", published on Sep. 13, 2010.
Apichayakul et al., "Correlations between in-flight Particle, Splat and Coating Microstructures of Ni20Cr Prepared by Flame and Arc Spray Processes", Department of Physics, Faculty of Science, Thailand, 2007.
English Abstract of CN103769594(A), "Technological method and device for preparing high-purity spherical superfine/nanoscale powdered materials in plasma atomization mode", published on May 7, 2014.
English Abstract of JPH06172818(A), "Production of Superfine Particles", published on Jun. 21, 1994.
English Abstract of JPS59118803(A), "Production of Ultrafine Metallic Particle", published on Jul. 9, 1984.
Sumper et al., "Electrical Energy Efficiency: Technologies and Applications", pp. 315-316, published on Feb. 20, 2012.
Rieken, Joel Rodney, "Gas atomized precursor alloy powder for oxide dispersion strengthened ferritic stainless steel", Iowa State University Capstones, Graduate Theses and Dissertations, 2011.
Federal Court between Tekna Plasma Systems Inc. and AP & C Advanced Powders & Coatings Inc., Statement of Claim filed on Jan. 16, 2019.
ALD Vacuum Technologies GmbH, "Ceramic Free Metal Powder Production", 2011.
A. Attalla, "Characterization of Titanium Metal Powder by Pulsed NMR", Mound Facility, Miamisburg, Ohio 45342, Oct. 12, 1977.
Sara Axelsson, "Surface Charactenzation of Titanium Powders with X-ray Pnotoelectron Spectroscopy", Diploma work No. 103/2012 at Department of Material Manufacturing Technology, Chalmers University of Technology, Gothenburg, Sweden.
ALD Vacuum Technologies GmbH, "Comparison between EIGA 50-500 (Standard) and EIGA 100-1000 (Designed)", 2011.
ALD Vacuum Technologies GmbH, "Sample Information For One (1) Inert Gas Atomization Plan Type EIGA 50-500—for Ceramic-Free Batch Atomization of up to 10 lbs. of Titanium Alloy", 2011.
P. Fauchais and A. Vardelle (2012). Thermal Sprayed Coatings Used Against Corrosion and Corrosive Wear, Advanced Plasma Spray Applications, Dr. Hamid Jazi (Ed.), ISBN: 978-953-51-0349-3, InTech, Available from: http://www.intechopen.com/books/advanced-plasma-spray-applications/thermal-sprayed-coatings-used-against-corrosion-and-corrosive-wear.
Lu et al., "Oxidation of a polycrystalline titanium surface by oxygen and water" Surface Science 458 (2000) 80-90.
Tanaka et al., "Active Hydroxyl Groups on Surface Oxide Film of Titanium, 316L Stainless Steel, and Cobalt-Chromium-Molybdenum Alloy and Its Effect on the Immobilization of Poly(Ethylene Glycol)", Materials Transactions, vol. 49, No. 4 (2008) pp. 805-811.
Abstract, Egry et al., "Surface tension and viscosity of liquid metals", Journal of Non-Crystalline Solids, vols. 156-158, Part 2, pp. 830-832 (May 2, 1993).

(56) References Cited

OTHER PUBLICATIONS

Horner et al., "The Effect of Process Parameters on Twin Wire Arc Spray Pattern Shape", Coatings Apr. 20, 2015, 115-123; doi:10.3390/coatings5020115.
Dr. Maher Boulos, Metal Powder, "Plasma power can make better powders", MFR May 2004, Elsevier Ltd., pp. 16-21.
European Search Report Corresponding to Application No. 16826954 dated Jul. 13, 2018.
European Search Report Corresponding to Application No. 16858532 dated May 13, 2019.
European Search Report Corresponding to Application No. 17781668 dated Mar. 28, 2019.
English Translation—Machine Translation of JP2004091843(A), "Manufacturing Method of High Purity High Melting Point Metal Powder", published on Mar. 25, 2004.
Machine Translated Japanese Search Report Corresponding to Application No. 2018521450 dated Apr. 2, 2020.
European Search Report Corresponding to Application No. 20181959 dated Aug. 31, 2020.
Combined Chinese Office Action and Search Report Corresponding to Application No. 201680052711 dated Sep. 16, 2020.
"Reactive Plasma Spray Forming of Al—TiAl3 Composites Using a Triple Plasma System", Doctor of Philosophy thesis by Majid Entezarian at the Faculty of Graduate Studies and Research of McGill University, Montreal, Canada, published in Jun. 2017.
"Study on Preparation of Superalloy Powders by Argon Atomization", Proceedings of the Third National Conference on Metal Powder Metallurgy, Chinese Academy of Metal Powder Metallurgy, pp. 209-210.
Entezarian et al., "Plasma atomization: A New Process Of Fine, Spherical Powders", JOM, vol. 48, Jun. 1996, pp. 53-56.

\* cited by examiner

PLASMA ATOMIZATION METAL POWDER MANUFACTURING PROCESSES AND SYSTEM THEREFOR

CROSS-REFERENCE TO RELATED APPLICATION

The present application is a 35 USC 371 national stage entry of PCT/CA2016/050786 filed on Jul. 6, 2016 and which claims priority on U.S. 62/193,622 filed on Jul. 17, 2015 and U.S. 62/251,476 filed on Nov. 5, 2015. These documents are hereby incorporated by reference in their entirety.

FIELD OF THE DISCLOSURE

The present disclosure relates to the field of production of spheroidal powders such as metal spheroidal powders. More particularly, it relates to methods and apparatuses for preparing metal powders by means of a plasma atomization process.

BACKGROUND OF THE DISCLOSURE

Typically, the desired features of high quality reactive metal powders will be a combination of high sphericity, density, purity, flowability and low amount of gas entrapped porosities. Fine powders are useful for applications such as 3D printing, powder injection molding, hot isostatic pressing and coatings. Such fine powders are used in aerospace, biomedical and industrial fields of applications.

Various solutions have been proposed so far concerning methods and apparatuses for preparing metal powders via a plasma atomization process. However, several problems have been encountered with those proposed solutions. For example, some of the proposed methods and apparatuses are not capable of obtaining spheroidal powders having a sufficient fine particle size distribution.

Moreover certain proposed solutions still involve high production costs and low production rates.

Some other issues have been encountered regarding the percentage of 0-106 μm particle in raw metal powder produced. In fact, so far, not so many technologies have allowed to produce raw metal powder having a high 0-106 μm particle size distribution yield. In fact, some technologies only produce a very low amount of particles having a size of 0-106 μm. For example, some technologies produce only 20-40% of grade 0-106 μm powder while other technologies do not go above about 60 or 70%. Thus, those prior art technologies do not allow for preparing raw metal powder having high 0-106 μm particle size distribution yields. Low yields significantly increases production costs and generates a lot of waste material. Moreover, typical process, such as EIGA process, may require a very large quantity of atomizing gas in order to achieve the yield of 70% of particles having a size between 0-106 μm. For example, the Gas to Metal ratio in EIGA process can be as high as about 33. This may further increase production costs.

SUMMARY

It would thus be highly desirable to be provided with a device, system or method that would at least partially address the disadvantages of the existing technologies.

The embodiments described herein provide in one aspect a plasma atomization metal powder manufacturing process comprising:

providing a heated metal source; and
contacting said heated metal source with the plasma of at least one plasma source under conditions effective for causing atomization of said heated metal source.

The embodiments described herein provide in another aspect a plasma atomization metal powder manufacturing process comprising:

providing a heated metal source; and
contacting said heated metal source with the plasma of at least one plasma source under conditions effective for causing atomization of said heated metal source, thereby obtaining a raw metal powder having a 0-106 μm particle size distribution yield of at least 80%, measured according to ASTM B214.

The embodiments described herein provide in another aspect a plasma atomization metal powder manufacturing process comprising providing a heated metal source, contacting said heated metal source with the plasma of at least one plasma source under conditions effective for causing atomization of said heated metal source, wherein said atomization is carried out by using a gas to metal ratio of less than about 20, thereby obtaining a raw metal powder having a 0-106 μm particle size distribution yield of at least 80%, measured according to ASTM B214.

The embodiments described herein provide in another aspect a plasma atomization metal powder manufacturing process comprising providing a heated metal source, contacting said heated metal source with the plasma of at least one plasma source under conditions effective for causing atomization of said heated metal source, wherein said atomization is carried out by using a gas to metal ratio of less than about 20, thereby obtaining a metal powder having a 0-106 μm distribution of at least 80%.

The embodiments described herein provide in another aspect a plasma atomization manufacturing process comprising providing a heated metal source, aligning the heated metal source with the plasma of at least one plasma source, and contacting the heated metal source with the plasma of the least one plasma source under conditions effective for causing atomization of said heated metal source.

The embodiments described herein provide in yet another aspects A atomizing system comprising a feeder for feeding a metal source, at least one heating system for heating the metal source, at least one plasma source configured for contacting the metal source after heating with plasma under conditions effective for causing atomization of the heated metal source, and an alignment system positioned upstream of the at least one plasma source, the alignment system being adapted to adjust an orientation of the metal source relative to the at least one plasma source.

DRAWINGS

The following drawings represent non-limitative examples in which.

DESCRIPTION OF VARIOUS EMBODIMENTS

Figure 1:
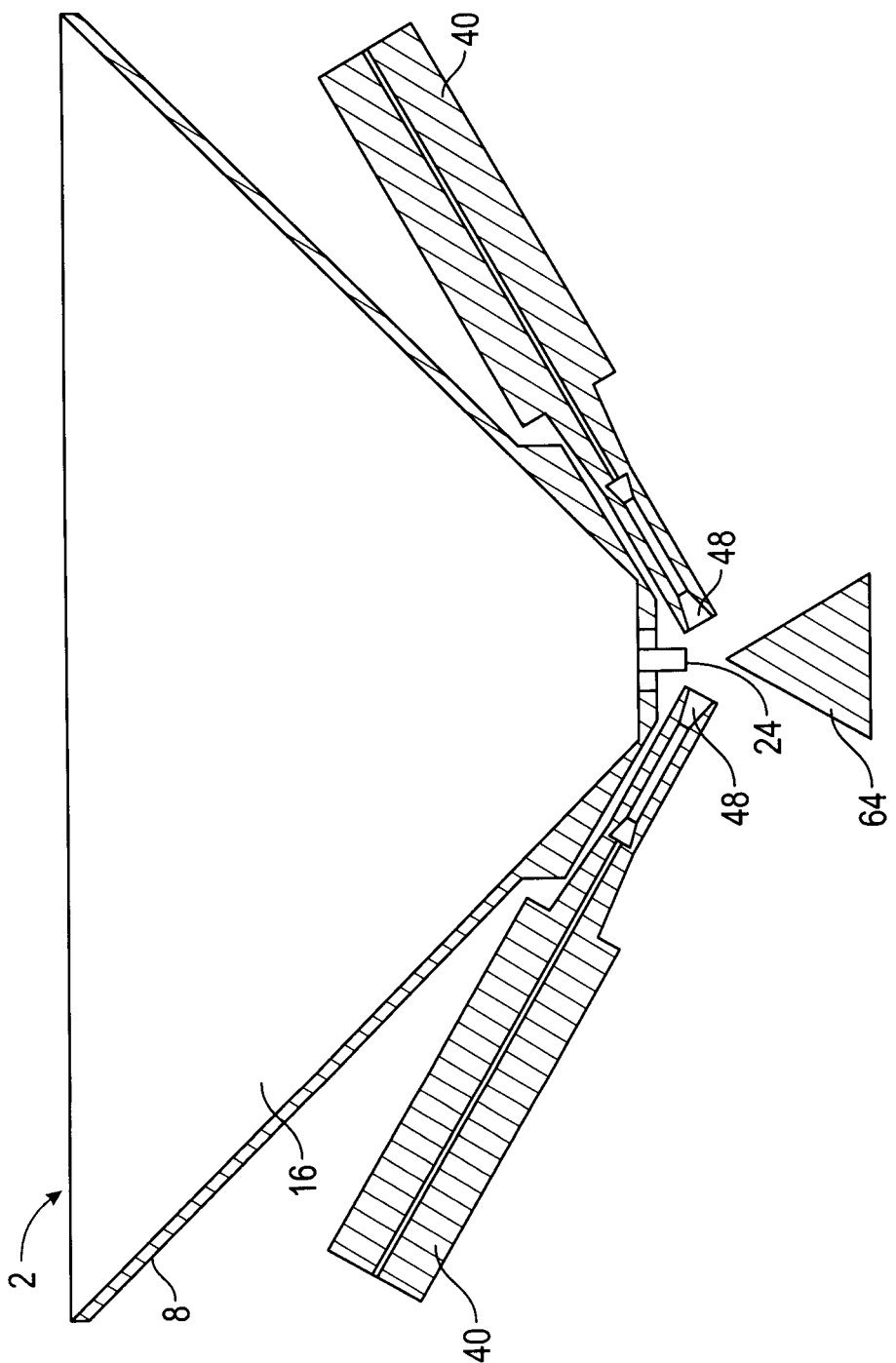
FIG. 1 is a cross-sectional view of an atomizing system according to a first exemplary embodiment of the present disclosure.

The following examples are presented in a non-limiting manner.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The expression "atomization zone" as used herein, when referring to a method, apparatus or system for preparing a metal powder, refers to a zone in which the material is atomized into droplets of the material. The person skilled in the art would understand that the dimensions of the atomization zone will vary according to various parameters such as temperature of the atomizing means, velocity of the atomizing means, material in the atomizing means, power of the atomizing means, temperature of the material before entering in the atomization zone, nature of the material, dimensions of the material, electrical resistivity of the material etc.

The expression "metal powder has a X-Y μm particle size distribution yield of at least T %, measured according to ASTM B214" refers to a metal powder in which at least T % of the obtained powder has a particle size distribution of about X to about Y μm. The value is measured according to ASTM B214 standard.

The expression "metal powder having a 0-106 μm particle size distribution yield of at least 80%, measured according to ASTM B214" refers to a metal powder in which at least 80% of the obtained powder has a particle size distribution of about 0 to about 106 μm. The value is measured according to ASTM B214 standard The expression "Gas to Metal ratio" as used herein refers to the mass per unit of time (Kg/s) of gas injected for the mass rate (Kg/s) of metal source to the atomization zone.

The expression "reactive metal powder" as used herein refers to a metal powder that cannot be efficiently prepared via the classical gas atomization process in which close-coupled nozzle is used. For example, such a reactive metal powder can be a powder comprising at least one member chosen from one of titanium, titanium alloys, zirconium, zirconium alloys, magnesium, magnesium alloys, niobium, niobium alloys, aluminum, aluminum alloys, molybdenum, molybdenum alloys, tungsten, tungsten alloys, oxygen-reactive metals, and nitrogen-reactive metals.

The term "raw metal powder" as used herein refers to a metal powder obtained directly from an atomization process without any post processing steps such as sieving or classification techniques.

Various exemplary embodiments described herein provide a high yield of raw metal powder of a given distribution while keeping low production costs. Production costs are kept low by minimizing the waste and by reducing the gas flow (i.e. amount of gas) that is used in the atomization process. For example, the gas to metal ratio according to methods and systems described herein is less than 30.

According to various exemplary embodiments, a metal source is provided. The raw metal powder is to be formed from the atomization of this metal source. The metal source is preheated prior to entering in the atomization zone.

In some exemplary embodiments, the metal source has already been heated prior to being fed into an atomization zone. However, the metal source is further heated immediately upstream of the atomization zone so that the metal source reaches a sufficient temperature prior to being atomized. Having reached the sufficient temperature, the metal source is atomized by being contacted by plasma from at least one plasma source under conditions that are effective for causing atomization of the heated metal source.

For example, the raw material can be melted in a water-cooled crucible (skull melting). The metal source is then a melt stream that can be further heated and fed to the atomization zone to be contacted by the plasma from the at least one plasma source to be atomized.

For example, the metal source may be initially fed as a metal wire or metal rod. Prior to atomization, the metal wire or metal rod may be further heated by resistive heating, arc discharge, induction heating or any combination thereof. After being heated, the metal wire or metal rod is fed into the atomization zone to be contacted by the plasma from the at least one plasma source to be atomized.

By sufficiently heating the metal source prior to atomization and a proper alignment, a high yield of atomized raw metal powder can be achieved. This higher yield can be achieved without a significant increase in production costs in comparison to plasma torch energy costs. For example, the temperature of the metal source prior to atomization can be close to the melting point of the material. For example, the temperature can be about 75% to about 110% of the melting point temperature or about 85% to about 95% of the melting point temperature.

For example, the high yield of fine powder is achieved for a low amount of very hot gas flow injected within the atomization zone. It will be appreciated that the injected gas will often be an inert gas. Reducing the amount of injected gas can significantly decrease production costs, especially the recycling gas costs.

According to various exemplary embodiments, to achieve the yields provided herein, the plasma from the at least one plasma source must provide sufficient heating energy and momentum to the metal source during atomization. The plasma gas flow is typically more than 100 slm per torch, more preferably more than 150 slm for 3 convergent plasma torches for a mass feed rate of titanium of about 10 kg/h. The electrical power per torch is about 25 kW and more preferably about 30 kW and more.

It will be appreciated that an increased amount of power and energy is required in order to provide the amount of heat required from the at least one plasma source. It has been observed that according to various exemplary embodiments, the cost savings (yield) obtained from lowering the amount of gas injected during atomization significantly outweigh the cost increases from higher electrical power consumption by the at least one plasma source.

According to various exemplary embodiments, raw metal powder may be formed from atomizing the metal source while using a gas-to-metal ratio of less than about 20.

According to various exemplary embodiments, raw metal powder may be formed from atomizing the metal source while using a gas-to-metal ratio of about 5 to about 15.

According to various exemplary embodiments, raw metal powder may be formed from atomizing the metal source while using a gas-to-metal ratio of about 2 to about 10.

According to various exemplary embodiments, raw metal powder may be formed from atomizing the metal source while using a gas-to-metal ratio of about 5 to about 10.

According to various exemplary embodiments, raw metal powder may be formed from atomizing the metal source while using a gas-to-metal ratio of about 10 to about 20.

According to various exemplary embodiments, raw metal powder may be formed from atomizing the metal source while using a gas-to-metal ratio of about 10 to about 15.

According to various exemplary embodiments, the raw metal powder obtained from atomization has a 0-106 µm particle size distribution yield of at least 80%.

According to various exemplary embodiments, the raw metal powder obtained from atomization has 0-106 µm particle size distribution yield of at least 85%.

According to various exemplary embodiments, the raw metal powder obtained from atomization has a of 0-106 µm particle size distribution yield of at least 90%.

According to various exemplary embodiments, the raw metal powder obtained from atomization has a 0-75 µm particle size distribution yield of at least 85%.

According to various exemplary embodiments, the raw metal powder obtained from atomization has a 0-45 µm particle size distribution yield of at least 50%.

According to various exemplary embodiments, the raw metal powder obtained from atomization has a 0-45 µm particle size distribution yield of at least 60%.

According to various exemplary plasma atomization metal powder manufacturing processes, the metal source fed into the atomization zone is appropriately positioned relative to the plasma and the at least one plasma source.

For example, the metal source fed into the atomization zone and the at least one plasma source is positioned relative to one another so that metal source contacts the plasma at an apex of the plasma source. This may be the geometric apex of the plasma source. It was observed that the apex of the plasma source corresponds to the region where the atomizing shearing forces of the plasma are the greatest.

The proper relative positioning of the metal source within the atomization zone and the at least one plasma source may require the nozzle outlet of the plasma source to be placed in close proximity of the metal source in the atomization zone.

For example, the plasma source is positioned so that its nozzle outlet is within at most about 5 centimeters of the metal source.

For example, the plasma source is positioned so that its nozzle outlet is within at most about 3 centimeters of the metal source.

For example, the plasma source is positioned so that its nozzle outlet is within at most about 2.5 centimeters of the metal source.

For example, the plasma source is positioned so that its nozzle outlet is within at most about 2 centimeters of the metal source.

For example, the plasma source is positioned so that its nozzle outlet is within at most about 1.9 centimeters of the metal source.

For example, the plasma source is positioned so that its nozzle outlet is within at most about 1.75 centimeters of the metal source.

For example, the plasma source is positioned so that its nozzle outlet is within at most about 1.5 centimeters of the metal source.

According to various exemplary embodiments, the metal source is fed into the atomization zone as a vertical feed. This feed may be a melt stream, metal rod or metal wire.

The at least one plasma source may be at least one plasma torch having at least one discrete nozzle. Where a plurality of discrete nozzles is provided, these nozzles may be positioned angularly about the metal source vertical feed.

Alternatively, the at least one plasma source may include an annular nozzle extending around the metal source vertical feed.

According to various exemplary embodiments, the at least one nozzle of the at least one plasma source may be angled downwardly. For example, the at least one plasma source may emit plasma jets that are oriented at about 10° to about 60° relative to the vertical axis.

For example, the at least one plasma source may emit plasma jets that are oriented at about 20° to about 60° relative to the vertical axis.

For example, the at least one plasma source may emit plasma jets that are oriented at about 20° to about 50° relative to the vertical axis.

For example, the at least one plasma source may emit plasma jets that are oriented at about 20° to about 30° relative to the vertical axis.

For example, the at least one plasma source may emit plasma jets that are oriented at about 25° to about 35° relative to the vertical axis.

According to various exemplary plasma atomization metal powder manufacturing processes, the metal source fed into the atomization zone is aligned with the plasma of the at least one plasma source. The aligning may include adjusting the orientation of the metal source as it is being fed into the atomization zone. This adjustment seeks to maintain a desired positioning of the metal source relative to the at least one plasma source and/or the plasma from the at least one plasma source over time.

It has been observed that the position of the metal source being fed into the atomization zone can spatially fluctuate over time. This spatial fluctuate may occur between separate atomization runs or within a single atomization run. Accordingly, the orientation of the metal source as it is being fed into the atomization zone may be adjusted prior to beginning an atomization run. The melt stream falling from a melted rod can move and not always contact the exact plasma jet apex (atomization point). The hot wire and small rod can bend and move away from the optimal atomization point.

Additionally or alternatively, the orientation of the metal source as it is being fed into the atomization zone may be adjusted repeatedly during an ongoing atomization process. The adjustment of the orientation of the metal source may be carried out continuously or intermittently in order to maintain a desired alignment of the metal source with the plasma source and/or the plasma from the at least one plasma source.

For example, during an atomization process, the orientation of the metal source being fed into the atomization zone may be visually monitored by a human operator. When the operator perceives that the metal source has spatially fluctuated so as to no longer be in its desired alignment, the operator may operate (manually or via inputting of a computerized command) an alignment-correcting mechanism so as to adjust orientation of the metal source back to the desired alignment.

Additionally or alternatively, during the atomization process, the orientation of the metal source being fed into the atomization zone may be monitored by a computerized monitoring system. The computerized system may capture images of the metal source relative to the plasma and/or the at least one plasma source. By applying image analysis and/or processing techniques, the system identifies when the metal source has spatially fluctuated so as to no longer being in its desired alignment. The computerized system can further determine an amount of the deviation and the correction required. The computer system can then issue a command to an alignment-correcting mechanism so as to adjust orientation of the metal source back to the desired alignment.

For example, the desired alignment may be alignment of the metal source fed into the atomization zone with an apex of the plasma jet from the at least one plasma source.

For example, the process can comprise aligning the heated metal source with the plasma of at least one plasma source comprises positioning the heated metal source within at most 5 centimeters from an outlet nozzle of the at least one plasma source.

For example, the process can comprise aligning the heated metal source with the plasma of at least one plasma source comprises positioning the heated metal source within at most 2.5 centimeters from an outlet nozzle of the at least one plasma source.

For example, the process can comprise aligning the heated metal source with the plasma of at least one plasma source comprises positioning the heated metal source within at most 1.9 centimeters from an outlet nozzle of the at least one plasma source.

Referring now to FIG. 1, therein illustrated is a cross-sectional view of an atomizing system 2 according to a first exemplary embodiment. The first atomizing system 2 includes a receptacle 8 that receives a feed of metal source 16 from an upstream system. The receptacle 8 may be a crucible. The metal source 16 within the receptacle 8 may be heated using various techniques known in the art, such as cooled-crucible technology (skull melting).

It will be appreciated that heating of the metal source 16 within the receptacle 8 corresponds to heating of the metal source 16 prior to atomization. After being heated within the receptacle 8, the metal source 16 is fed through an outlet 24 of the receptacle into the atomization zone 32. For example, the heated metal source 16 exits through the outlet 24 under the forces of gravity.

The heated metal source 16 exited from the receptacle 8 and fed into the atomization zone 32 is immediately contacted with plasma from at least one plasma source 40 that is also used to heat the high pressure cold gas that will produce a secondary atomization.

According to the illustrated example, the plasma source 40 includes at least one plasma torch. At least one angular nozzle 48 of the at least one plasma torch 40 is centered upon the metal source feed. For example, the cross-section of the nozzle 48 may be tapered towards the metal source feed so as to focus the plasma that contacts the metal source feed. As described elsewhere herein, the nozzle 48 may be positioned so that the apex of the plasma contacts the metal source fed from the receptacle 8. The contacting of the metal source feed by the plasma from the at least one plasma source 40 causes the metal source to be atomized.

Where a plurality of plasma torches are provided, the nozzles of the torches are discrete nozzles 48 of the plasma torches that are oriented towards the metal source from the receptacle 8. For example, the discrete nozzles 48 are positioned so that the apexes of the plasma outputted therefrom contacts the metal source from the receptacle 8.

The atomizing system 2 further includes a gas source that feeds a secondary high pressure gas towards the atomization zone. The secondary gas flow contacts the pre-atomized metal source feed immediately after they have been formed from the plasma atomization. For example, the gas source (not shown) can feed a high-pressure cold gas. For example, the gas fed from the gas source is an inert gas.

Formed raw metal powder 64 is exited from the atomization zone 32.

Figure 2:
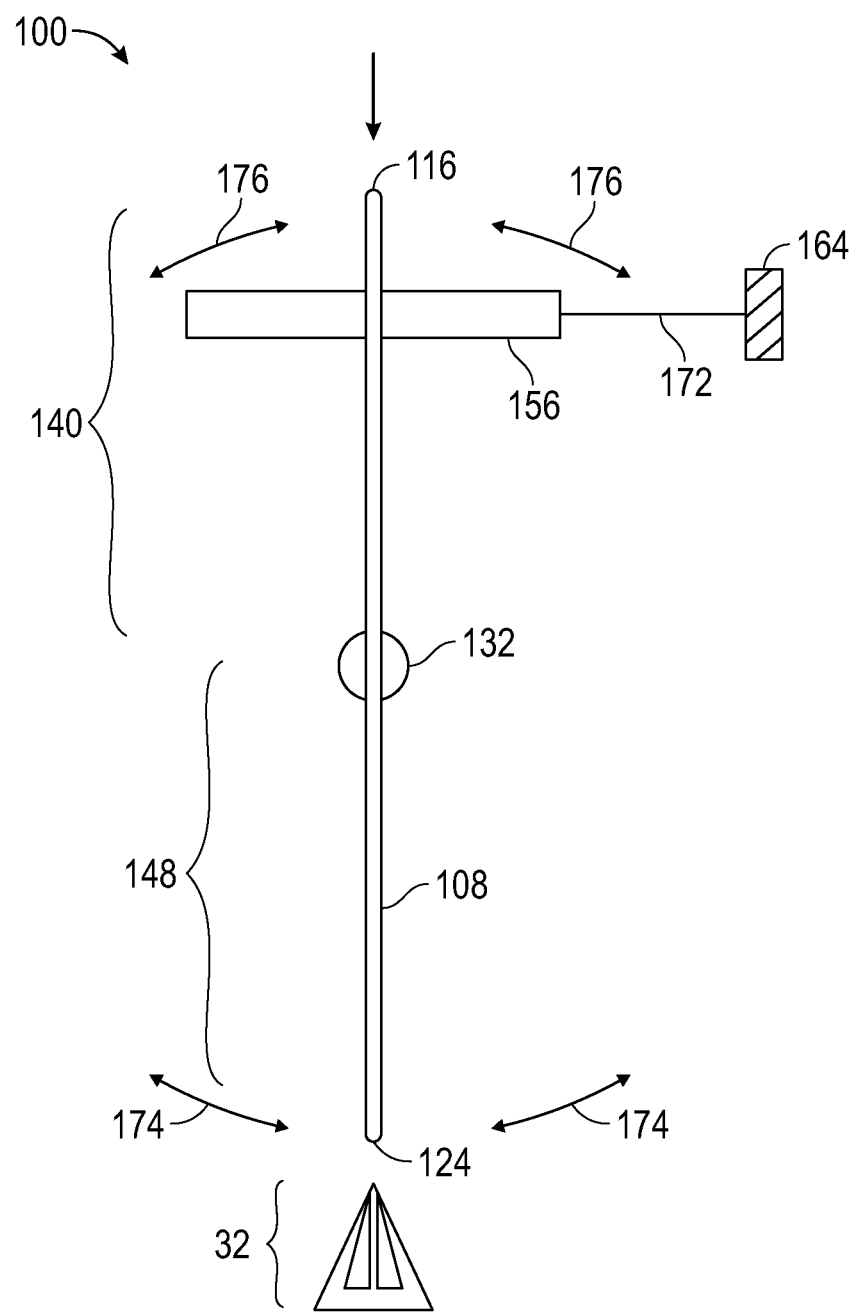
FIG. 2 is a schematic diagram of an aligning system of an atomizing system according to one exemplary embodiment of the present disclosure.

Referring now to FIG. 2, therein illustrated is a schematic diagram of an adjustable guiding system 100 of an atomizing system according to various exemplary embodiments. The guiding system includes a guide 108 that defines a through channel. The guide 108 is positioned upstream of the atomization zone 32. The metal source that is received from an upstream system is fed into an inlet 116 of the guide 108. The metal source is then displaced through the channel of the guide 108. The metal source exits the guide 108 at an outlet 124 that is located in proximity of an atomization zone 32.

For example, the metal source 16 fed into the inlet 116 is in the form of a metal wire of a metal rod.

The orientation of the guide 108 is adjustable. By adjusting the orientation of the guide 108, the orientation of the metal source 16 exited from the guide 108 and fed into the atomization zone 32 is also adjusted. Accordingly, the alignment of the metal source 16 fed into the atomization zone relative to the plasma source (not shown in FIG. 2) may be adjusted via adjustments made to the guide 108.

According to one exemplary embodiment, and as illustrated, the guide 108 is pivotally coupled about a pivot point 132. The guide 108 may be coupled to a fixed portion of the atomizing system. By displacing an upper portion 140 of the guide 108, a lower portion 148 of guide 108 is displaced in a corresponding manner about the pivot point 132.

The guiding system 100 further includes an alignment-correcting mechanism that is operable to displace the guide 108. Displacement of the guide 108 in turn displaces the metal source 16.

According to one exemplary embodiment, and as illustrated, the alignment-correcting mechanism comprises a displaceable member 156 that is coupled to an upper portion 140 of the guide 108. The displaceable member 156 is further coupled to at least one adjustor 164 that can cause displacement of the displaceable member 156. For example, the adjustor 164 is an adjustment screw that is coupled to the displaceable member 156 via a threaded member 172. Turning of the adjustment screw 164 causes displacement of the threaded member 172, which further cause displacement of the displaceable member 156 and the guide 108. For example, a plurality of differently oriented adjustors 16 may be provided to displace displaceable member 156 and the guide 108 in different directions.

Arrows 174 denote possible directions of displacement of the guide member 108 within a plane. Arrows 176 denote possible displacement of the displaceable member 156 for causing displacement of the guide member 108 within a plane. It will be understood that the guide may be displaced in multiple directions.

Figure 3:
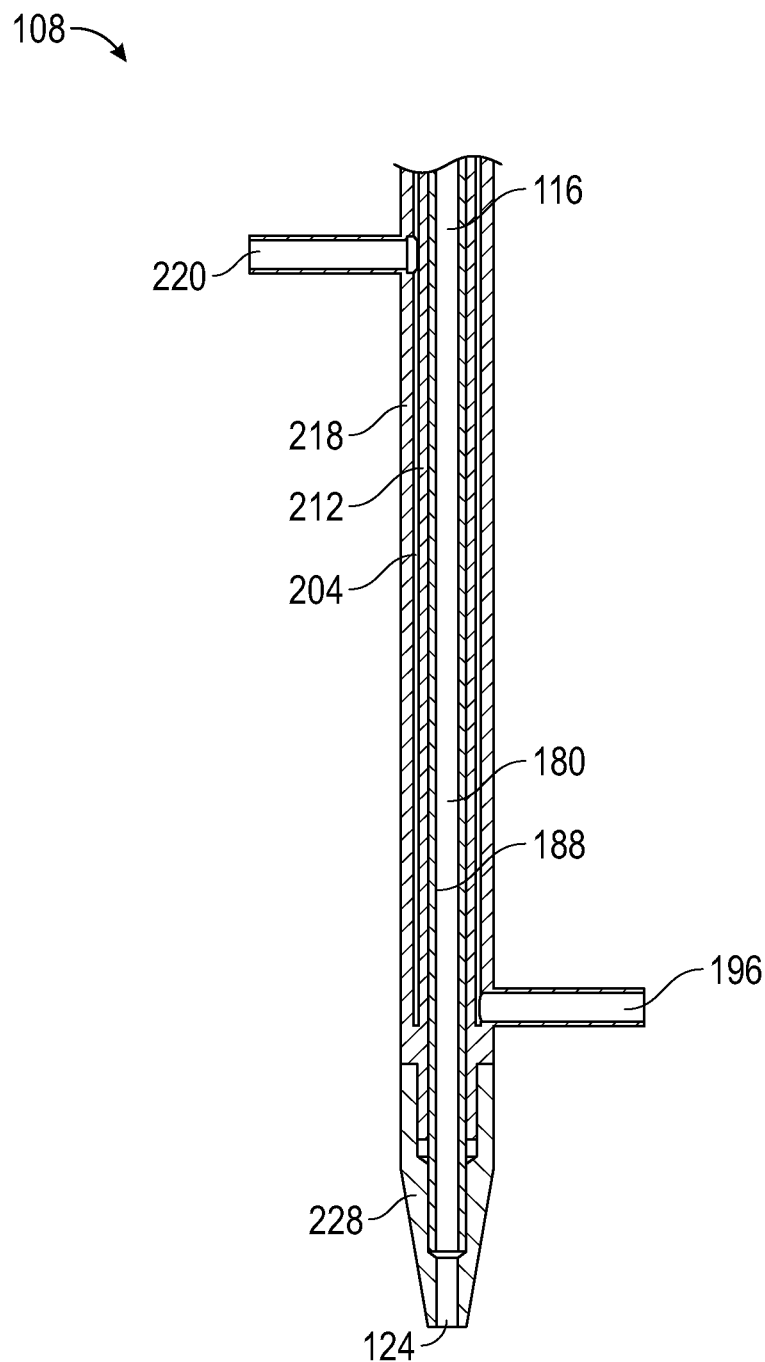
FIG. 3 is a cross-sectional view of a guide of a guided atomizing system according to one exemplary embodiment of the present disclosure.

Referring now to FIG. 3, therein illustrated is a cross-sectional view of a guide 108 according to one exemplary embodiment. As already described, the guide 108 defines a through channel 180 extending between its inlet 116 and outlet 124. An inner surface 188 of the through channel 180 may be lined with a material that does not contaminate the metal source 16 being displaced through the channel 180.

It has been observed that the risk of contamination of the metal source 16 increases when the inner surface 188 has an increasing temperature and/or is formed of a reactive material. For example, the inner surface 188 of the through channel 180 may be formed of a heat-resistant material. For example, the inner surface 188 of the through channel 180 may be formed of an electrically insulating material. For example, the inner surface 188 is formed of a ceramic material. The ceramic material can be chosen from alumina oxyde, macor, zirconia, yttria, SiAlON, silicon oxide and mixture thereof.

According to various exemplary embodiments, the guide 108 may be formed of a heat-resistant material.

According to various exemplary embodiments, the guide 108 may be formed of an electrically insulating material.

According to various exemplary embodiments, the guide 108 may be formed of a ceramic material.

According to various exemplary embodiments, and as illustrated, the guide 108 includes cooling so as to cool the guide and restrict contamination of the metal source 16 being displaced through it. For example, and as illustrated in FIG. 3, the guide 108 may have a cooling inlet 196 for receiving a cooling medium, such as a cooling gas or cooling liquid. The guide 108 is also double walled, wherein a cooling channel 204 is defined between an inner wall 212 and an outer wall 218. The cooling channel 204 is in fluid communication with the cooling inlet 196. For example, the cooling channel 204 extends angularly about an axis of the guide 108 and also extends over a substantial portion of the length of the guide 108. Cooling medium exits via a cooling outlet 220 after having flowed through the cooling channel 204. The cooling of the guide 108 may be important according to exemplary embodiments wherein the metal source is already heated prior to entering the guide 108 and/or wherein the metal source is heated as it is displaced through the guide 108.

For example, and as illustrated, the cooling inlet 196 is located downstream of the cooling outlet 220 along the path of displacement of the metal source 16 through the guide 108. Where the metal source 16 is heated, the metal source 16 at a downstream location, such as closer to the outlet 124, may be at a higher temperature than at an upstream location, such as the inlet 116. By positioning the inlet 196 downstream of the cooling outlet 220, cooling at a portion closer to the inlet 196 is prioritized.

According to various exemplary embodiments, a lower end 228 of the guide 108 may be removable and replaceable. It will be appreciated that the lower end 228 is position within or in proximity of the atomization zone. Accordingly, the lower end 228 may be exposed to higher temperatures than other portions of the guide 108. This higher temperature may result in faster wear and tear of the lower end 228 than other portions of the guide 108, which can cause the lower end 228 to be replaced more often than the guide 108 itself.

According to various exemplary embodiments, the metal source 16 may be heated as it is displaced through the guide 108.

Figure 4:
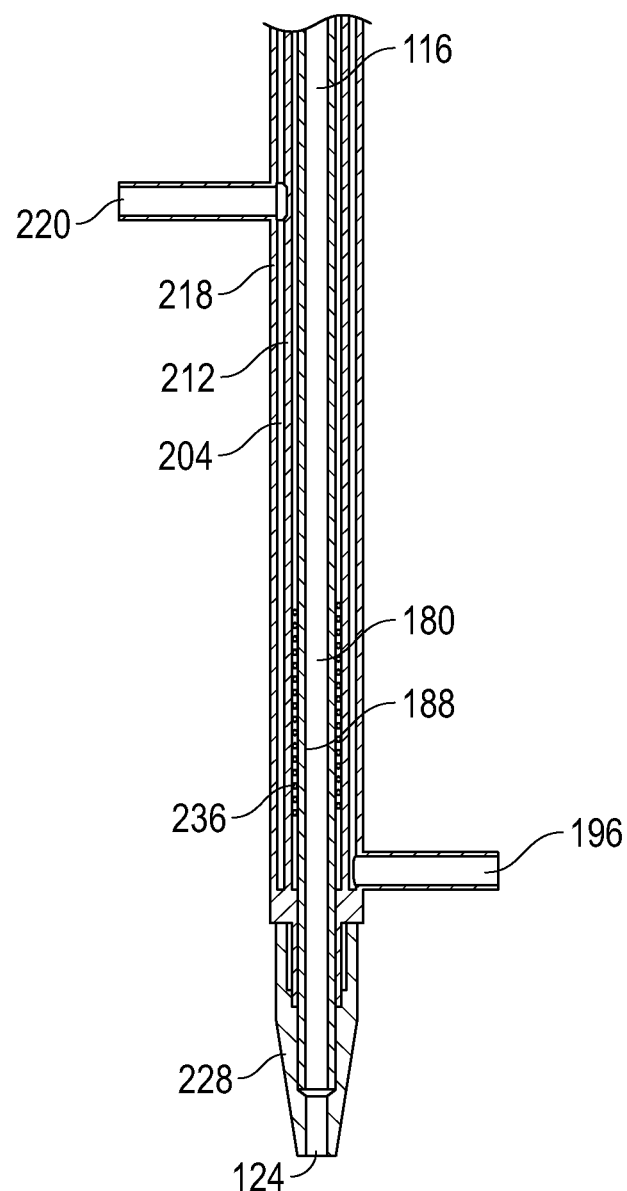
FIG. 4 is a cross-sectional view of a guide having an induction heating element according to one exemplary embodiment of the present disclosure.

Referring now to FIG. 4, therein illustrated is a cross-sectional view of a guide having at least one heating element. As illustrated, the heating element is a conductive coil 236 wound about a portion of the through channel 180. A current flowing through the conductive coil 236 produces a magnetic field, which further induces a current through the metal source 16 flowing through the channel 180. Due to electrical properties of the metal source 16, the induced current through the metal source 16 causes the metal source 16 to be heated. It will be appreciated that the metal source is heated via a form of inductive heating. It will be further appreciated that by providing an inner surface 188 and/or guide 108 that is electrically insulating, the magnetic field produced by the conductive coil 236 does not induce a current through the inner surface 188 and/or guide 108 that can cause heating.

Figure 5:
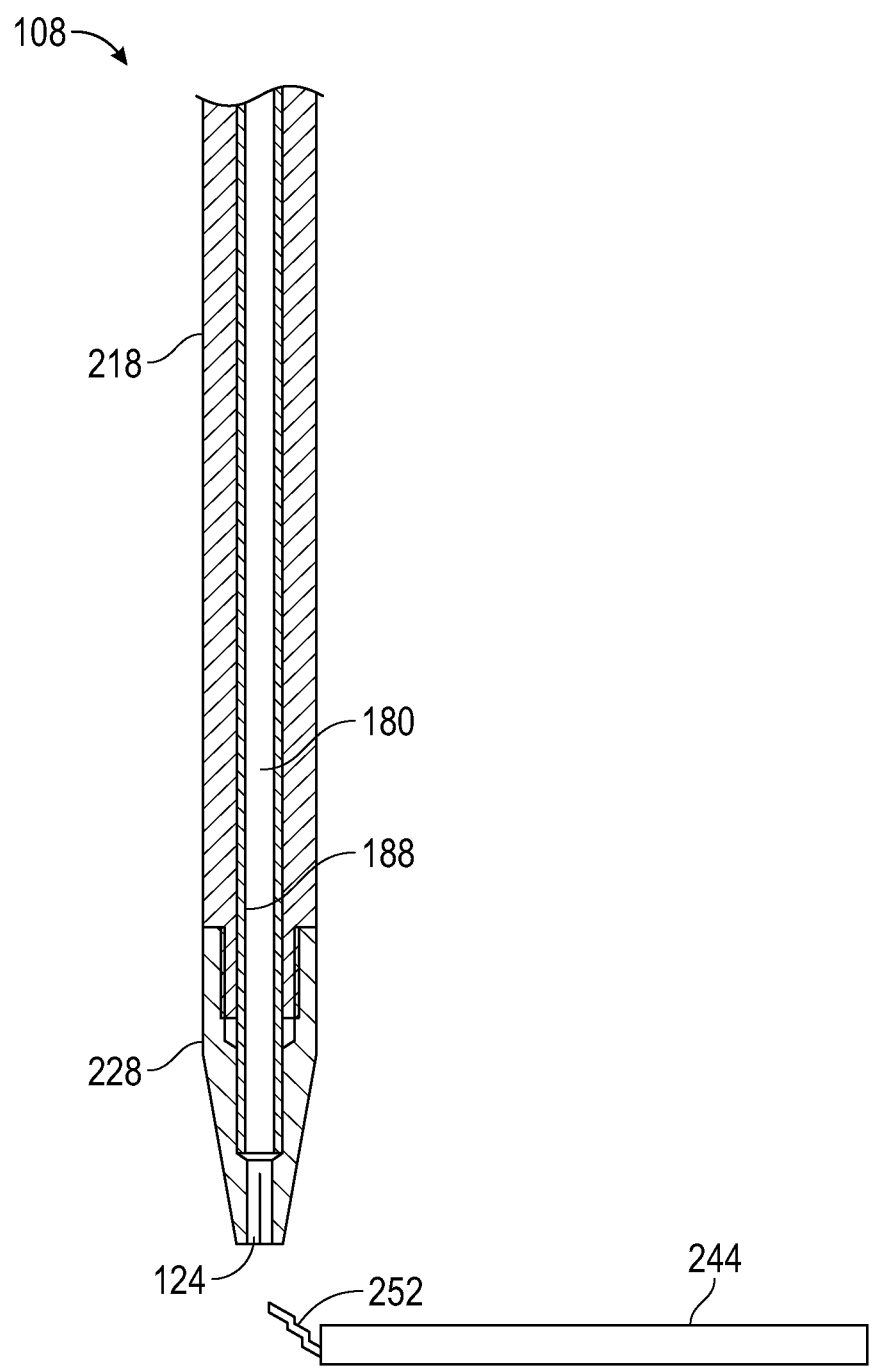
FIG. 5 is a cross-sectional view of a guide having at an electrode heating element according to another exemplary embodiment of the present disclosure.

Referring now to FIG. 5, therein illustrated is a cross-sectional view of a guide having an electrode 244 for arc discharge heating. It will be appreciated that the guide 108 illustrated in FIG. 5 does not have a cooling mechanism (cooling inlet 196, cooling channel 204 and cooling outlet 220). However, in other exemplary embodiments, a cooling mechanism may also be included in the guide 108. According to the illustrated example, the electrode 244 is placed in proximity of the metal source 16 as the source is exited from the outlet 124 of the guide 108. An electric arc 252 may be formed between the electrode 244 and the metal source 16, which causes heating of the metal source 16 by electric arc discharge.

According to other exemplary embodiments, the metal source 16 may be further heated by resistive heating prior to be exited. A first probe may contact the metal source 16 upstream of the guide 108 or within the guide 108. A second probe may contact the metal source 16 downstream of the guide 108 as the electrode 244. An electrical power source connects the two probes, thereby forming an electrical circuit through the portion of the metal source 16 extending between the two probes. The current flowing through this portion of the metal source 16 causes it to be heated. It will be appreciated that the metal source is heated via resistive and arc discharge heating.

Figure 6:
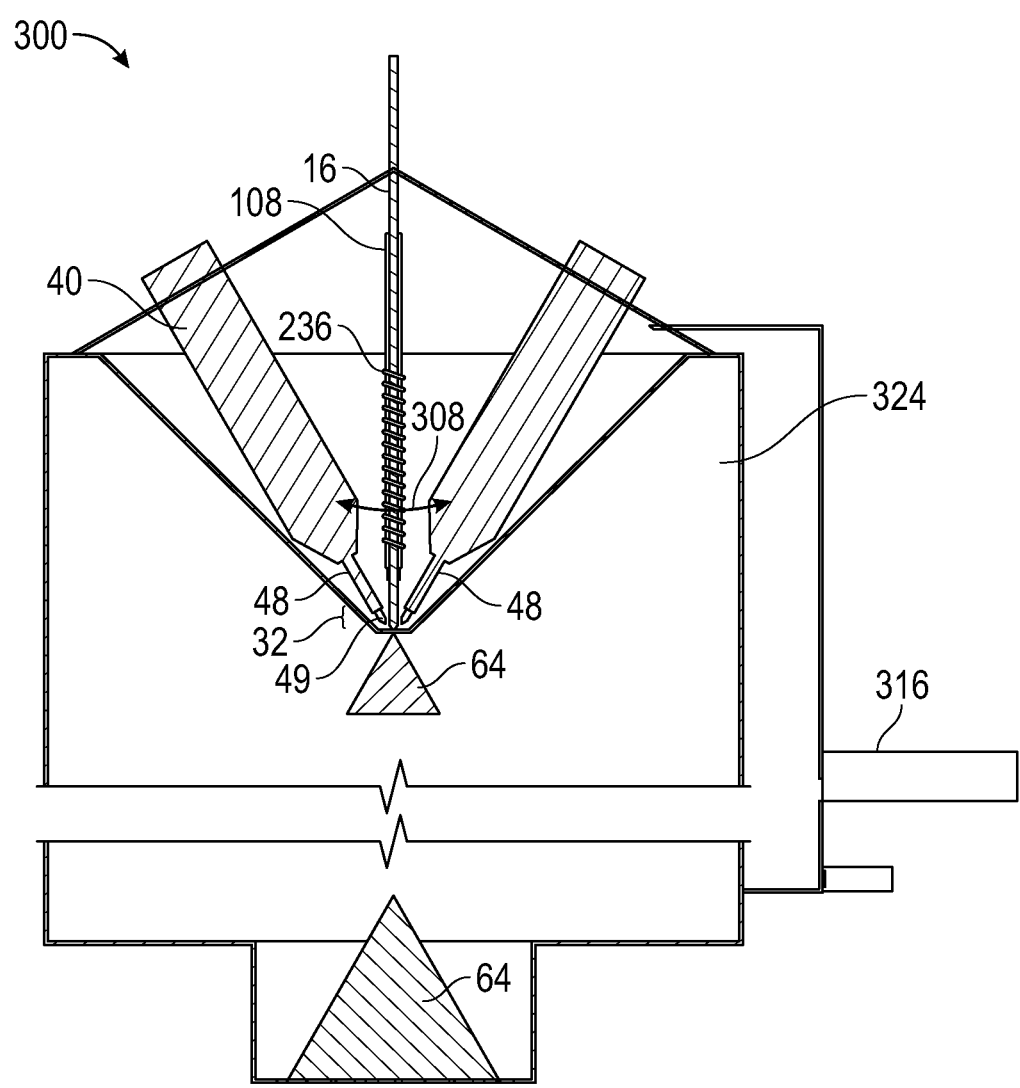
FIG. 6 is a cross-sectional view of a guided atomizing system according to a first exemplary embodiment of the present disclosure.

Referring now to FIG. 6, therein illustrated is a guided atomizing system 300 according to one exemplary embodiment. The metal source 16 extends through and is retained within a guide 108. The guide 108 is oriented so that the metal source 16 that is fed into the atomization zone 32 is appropriately aligned with the plasma jets 49 discharged from the nozzles 48 from the plasma sources 40.

Arrows 308 denote exemplary freedom of movement of the guide 108 and metal source 16. However, it will be understood that the metal source 16 and guide 108 may also be displaced in other directions. The orientation of the guide 108 may be adjusted to maintain proper alignment of the metal source 16 fed into the atomization zone with the plasma from the plasma source 40 and/or the nozzle 48 of the plasma source.

The illustrated example shows the plasma source 40 as being plasma torches with discrete nozzles. However, in other exemplary embodiments, the plasma source 40 may emit plasma from an annular nozzle.

According to the illustrated example, the atomizing system 300 includes a conductive coil 236 for induction heating of the metal source 16 as it is displaced through the guide 108.

Continuing with FIG. 6, the atomizing system 300 may further include a gas recovering system 316 which recovers the gas present within a collection chamber 324 downstream of the atomization zone 32. The recovered gas may be fed back into the atomization zone 32 as atomizing gas for the formed raw metal powders. Raw metal powders produced by the atomizing system 300 may be further collected within the atomizing system 300.

Figure 7:
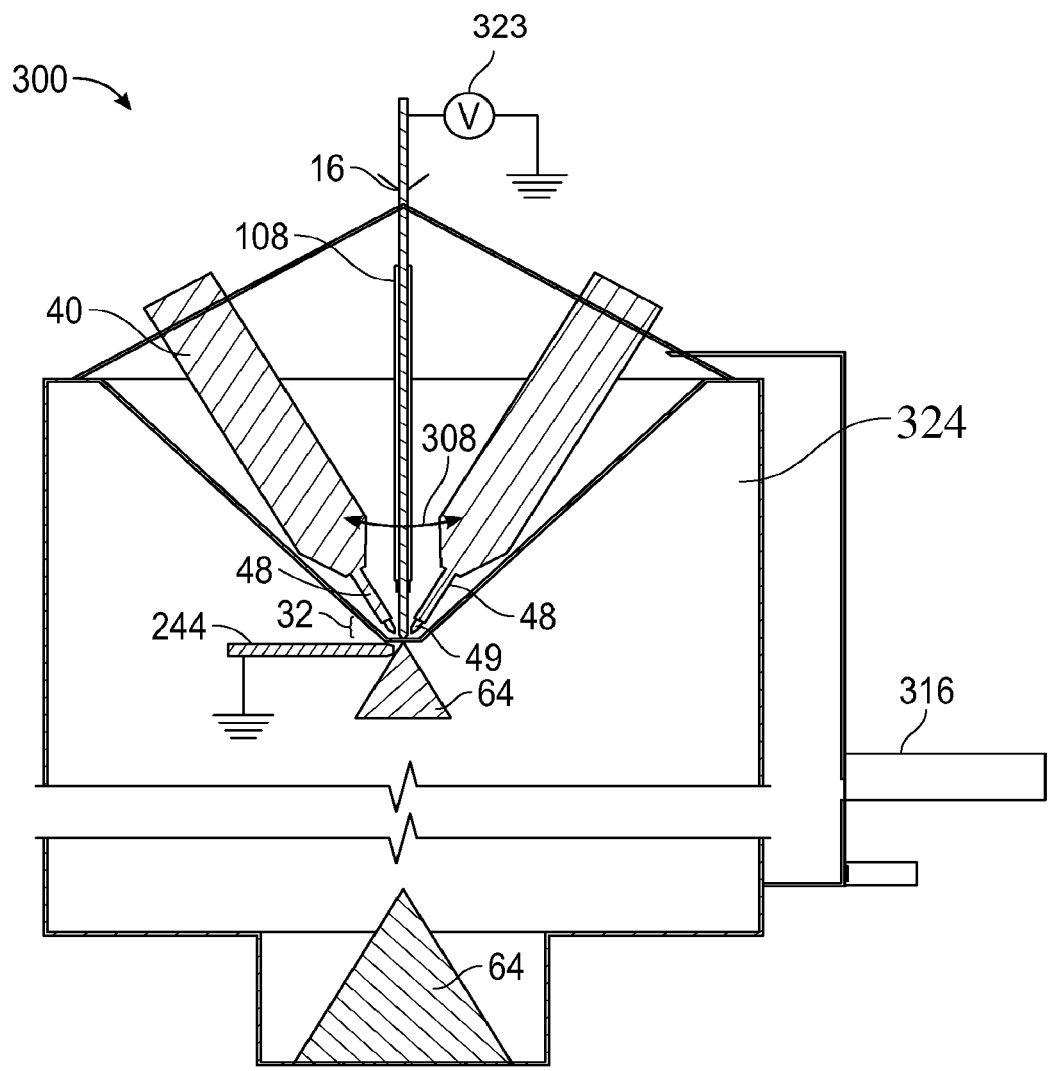
FIG. 7 is a cross-sectional view of a guided atomizing system according to a second exemplary embodiment of the present disclosure.

Referring now to FIG. 7, therein illustrated is a guided atomizing system 300 according to a variant exemplary embodiment. According to this variant example, guided atomizing system 300 includes an electrode 244 positioned in proximity of the atomization zone 300. The electrode 244 forms an electric arc with the metal source 16, which causes a current to flow through the metal source 16 to heat it. For example, an electrical power source 323 is provided to provide the current flow and create the electric arc.

Figure 8:
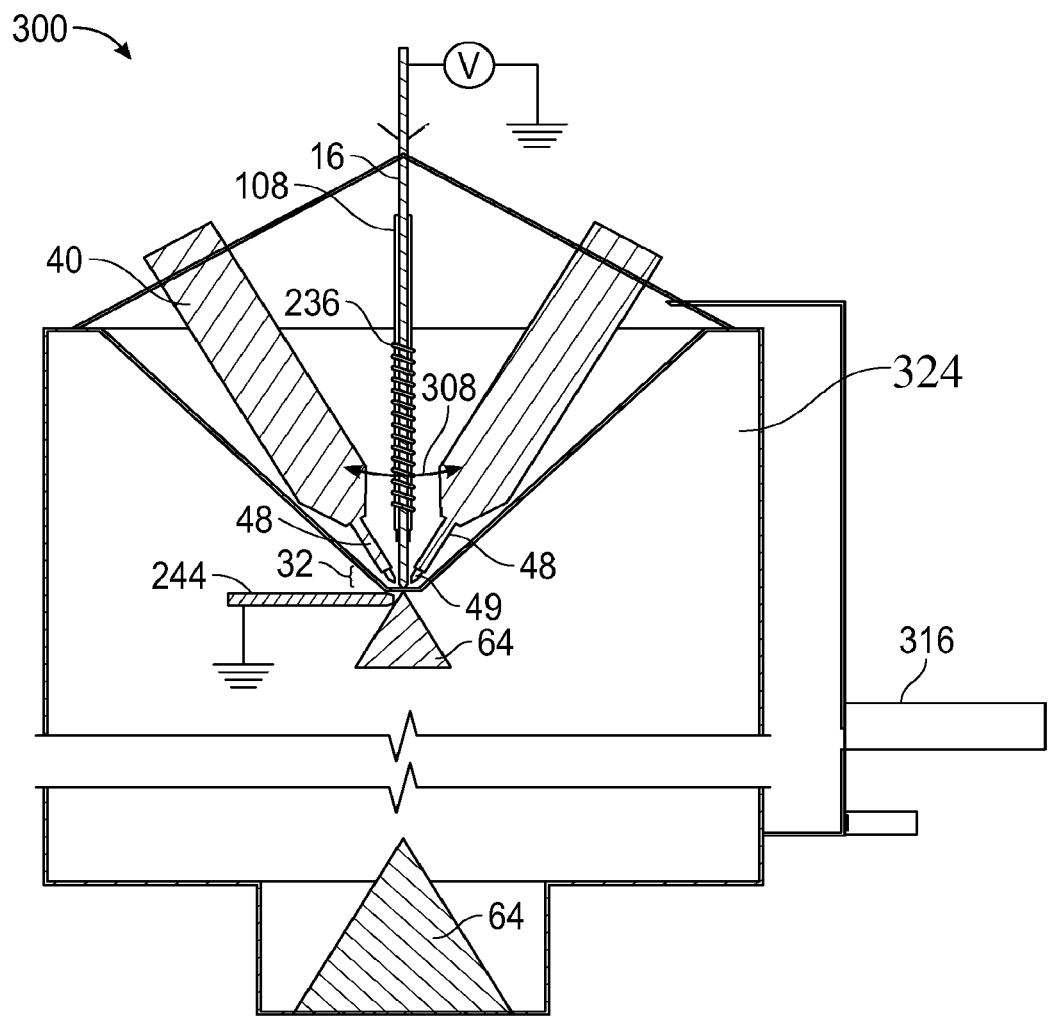
FIG. 8 is a cross-sectional view of a guided atomizing system according to a third exemplary embodiment of the present disclosure.

Referring now to FIG. 8, therein illustrated is a guided atomizing system 300 according to another variant exemplary embodiment. According to this variant example, the guided atomizing system 300 includes both a conductive coil 236 for causing induction heating of the metal source 16 and an electrode 244 for causing arc discharging heating of the metal source.

According to various exemplary processes and systems described herein, the heated melt source can comprise at least one member chosen from titanium, titanium alloys, zirconium, zirconium alloys, cobalt superalloys, nickel superalloys, magnesium, magnesium alloys, niobium, niobium alloys, aluminum, aluminum alloys, molybdenum, molybdenum alloys, tungsten, tungsten alloys, oxygen-reactive metals, and nitrogen-reactive metals.

According to various exemplary processes and systems described herein, the melt source can be chosen from titanium, titanium alloys, zirconium, zirconium alloys, cobalt superalloys, nickel superalloys, magnesium, magnesium alloys, niobium, niobium alloys, aluminum, aluminum alloys, molybdenum, molybdenum alloys, tungsten, tungsten alloys, oxygen-reactive metals, and nitrogen-reactive metals.

According to various exemplary processes and systems described herein, the melt source can be chosen from titanium, titanium alloys, zirconium, zirconium alloys, aluminum and aluminum alloys.

According to various exemplary processes and systems described herein, the melt source can be chosen from titanium alloys.

For example, the melt source can be a titanium alloy.

For example, the titanium alloy can be chosen from Ti-6A-4V, Ti-6Al-2Sn-4Zr-2Mo, Ti-5Al-5V-5Mo-3Cr, and titanium aluminides.

For example, the melt source can be chosen from unalloyed Ti Grades (for example grade 1, 2, 3 or 4); Ti alloys modified with Pd or Ru (for example grade 7, 11, 16, 17, 26 or 27); alpha and near-alpha Ti alloys (for example grade 6, 9, 12, 18, 28; alpha-beta Ti alloys (for example grade 5, 23 or 29); near-beta and beta Ti alloys (for example grade 19 or 20).

For example, plasma atomization can be carried out with various types of plasma torches such as DC plasma torches, AC plasma torches, RF plasma torches, microwave plasma torches or 3 phases plasma arc torches.

Example 1: Ti-6Al-4V Atomization

A plasma atomization run is achieved using a 0.125" diameter wire of Ti-6Al-4V (gr. 23) as raw material and 3 converging plasma jets oriented at about 30° with respect to the vertical axis. The plasma contacts the metal wire at a location that is within less than 2.5 centimeters of the plasma torch nozzle outlet. Each plasma torch is operated at a power of 30 kW with a 150 SLM argon gas flow.

A background sheath gas is also used to ensure proper transport of metal droplets. The sheath gas flow is at 550 SLM.

A dc electric current varying from 150 A to 180 A at an electric potential of 45 V is used to preheat the wire at elevated temperature prior to the atomization with the plasma jets and it results in a wire feed rate varying from 8 to 13 kg/h.

The wire is fed through a gas cooled and adjustable guide to enable a continuous metal feeding right to the apex of the plasma torch jets. The batch size is typically of 100 kg for each run.

The gas to metal ratio in these production runs is thus varying from 8.7 to 12.9.

The particle size distribution obtained is determined according to ASTM B214.

A first batch (batch 1) was produced using a gas-to-metal ration of 8.7 and a plasma outlet to atomization zone (location of contact between plasma and metal source) of about 2.5 centimeters.

A second batch (batch 2) was produced using a gas-to-metal ratio of 12.9 and a plasma outlet to atomization zone (location of contact between plasma and metal source) of about 1.9 centimeters.

The yield results for the batch 1 and 2 are:

TABLE 1

| Sieve (μm) | Batch 1 (% wt.) | Batch 2 (% wt.) |
| --- | --- | --- |
| >180 μm | 9.1 | 3.8 |
| ≤180 > 125 μm | 3.8 | 1.6 |
| ≤125 > 106 μm | 3.0 | 1.1 |
| ≤106 > 75 μm | 13.7 | 6.6 |
| ≤75 > 53 μm | 18.8 | 14.0 |
| ≤53 > 45 μm | 11.7 | 13.3 |
| ≤45 > 25 μm | 23.1 | 31.7 |
| ≤25 μm | 16.8 | 27.9 |
| 0-106 μm | 84.1 | 93.5 |
| 0-180 μm | 90.9 | 96.2 |
| 45-106 μm | 44.2 | 33.9 |
| 0-45 μm | 39.9 | 59.6 |

It was observed that the low gas-to-metal ratios produced a good yield of fine raw metal powder. For example, in batch 2, a yield of over 90% of 0-106 μm was obtained and a yield of almost 60% of 0-45 μm was obtained, while using a gas-to-metal ratio of 12.9.

It was observed that the distance between the atomization zone and the nozzle outlet is an important factor because gas velocity changes rapidly over distance.

Similar conditions to batch 2 were also tried but with higher throughput (i.e. lower gas to metal ratio of 9-10). The particle size distributions from these were very similar to the results for batch 2.

It will be appreciated that high yield of fine raw metal powders from atomization is significant for being able to supply large amount of powder at reasonable costs.

It was further observed that the chemical composition of the raw metal powder produced with plasma atomization process is very clean and does not have contamination. Without being tied to any particular theory, this may be due to the melting and atomizing of the metal source without contact with a contaminating surface.

The typical chemical composition obtain for a Ti-6Al-4V grade 23 powder is:

TABLE 2

POWDER COMPOSITION (weight percent)

| Element | Measured | Testing method |
|---|---|---|
| Oxygen (O) | 0.084 | ASTM E1409 - Inert gas fusion |
| Aluminum (Al) | 6.35 | ASTM E 2371- Direct current plasma emission spectroscopy |
| Iron (Fe) | 0.21 | ASTM E 2371- Direct current plasma emission spectroscopy |
| Vanadium (V) | 3.97 | ASTM E 2371- Direct current plasma emission spectroscopy |
| Nitrogen (N) | 0.02 | ASTM E1409 - Inert gas fusion |
| Carbon (C) | 0.01 | ASTM E1941 - Combustion infrared detection |
| Hydrogen (H) | 0.001 | ASTM E 1447 - Inert gas fusion |
| Tin (Sn) | 0.01 | ASTM E 2371- Direct current plasma emission spectroscopy |
| Molybdenum (Mo) | <0.01 | ASTM E 2371- Direct current plasma emission spectroscopy |
| Copper (Cu) | <0.01 | ASTM E 2371- Direct current plasma emission spectroscopy |
| Manganese (Mn) | 0.01 | ASTM E 2371- Direct current plasma emission spectroscopy |
| Zirconium (Zr) | <0.01 | ASTM E 2371- Direct current plasma emission spectroscopy |
| Yttrium (Y) | <0.001 | ASTM E 2371- Direct current plasma emission spectroscopy |
| Zinc (Zn) | <0.001 | ASTM E 2371- Direct current plasma emission spectroscopy |
| Others, each | <0.08 | ASTM E 2371- Direct current plasma emission spectroscopy |
| Others, total | <0.30 | ASTM E 2371- Direct current plasma emission spectroscopy |
| Titanium (Ti) | Balance | ASTM E 2371- Direct current plasma emission soectroscopy |
| Sn + Mo + Cu + Mn | <0.15 | |

The powder produced is very pure and spherical and contains a large fraction of fine powder that can be used in applications such laser additive manufacturing and powder injection molding.

Figure 9:
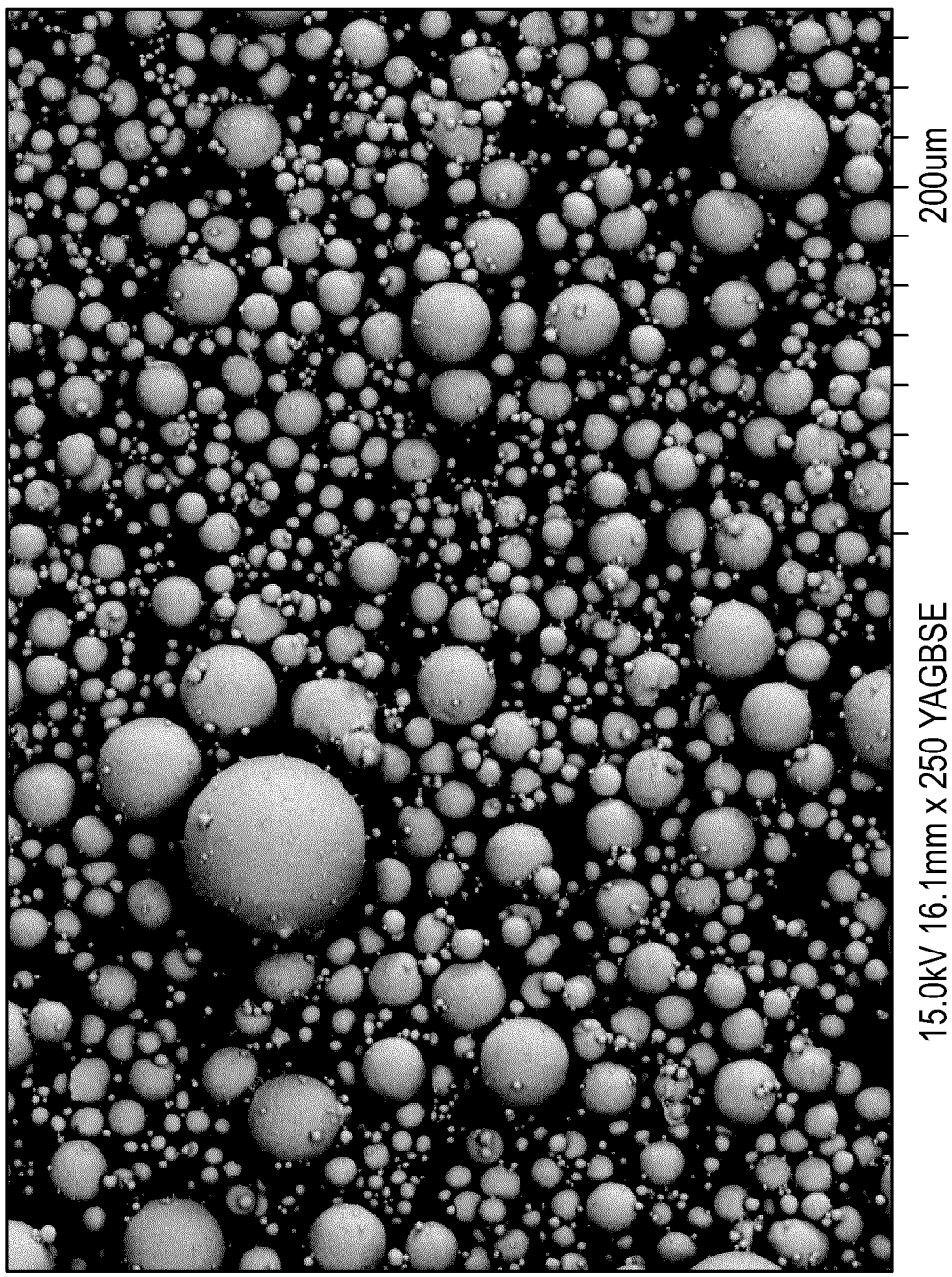
FIG. 9 is a SEM image at 250 times magnification of metal particles (Ti-6Al-4V) according to one example atomization process of the present disclosure.

FIG. 9 is a scanning electron microscopy (SEM) image at 250 times magnification of the as-is raw metal powders formed (without sieving) within the example process.

Figure 10:
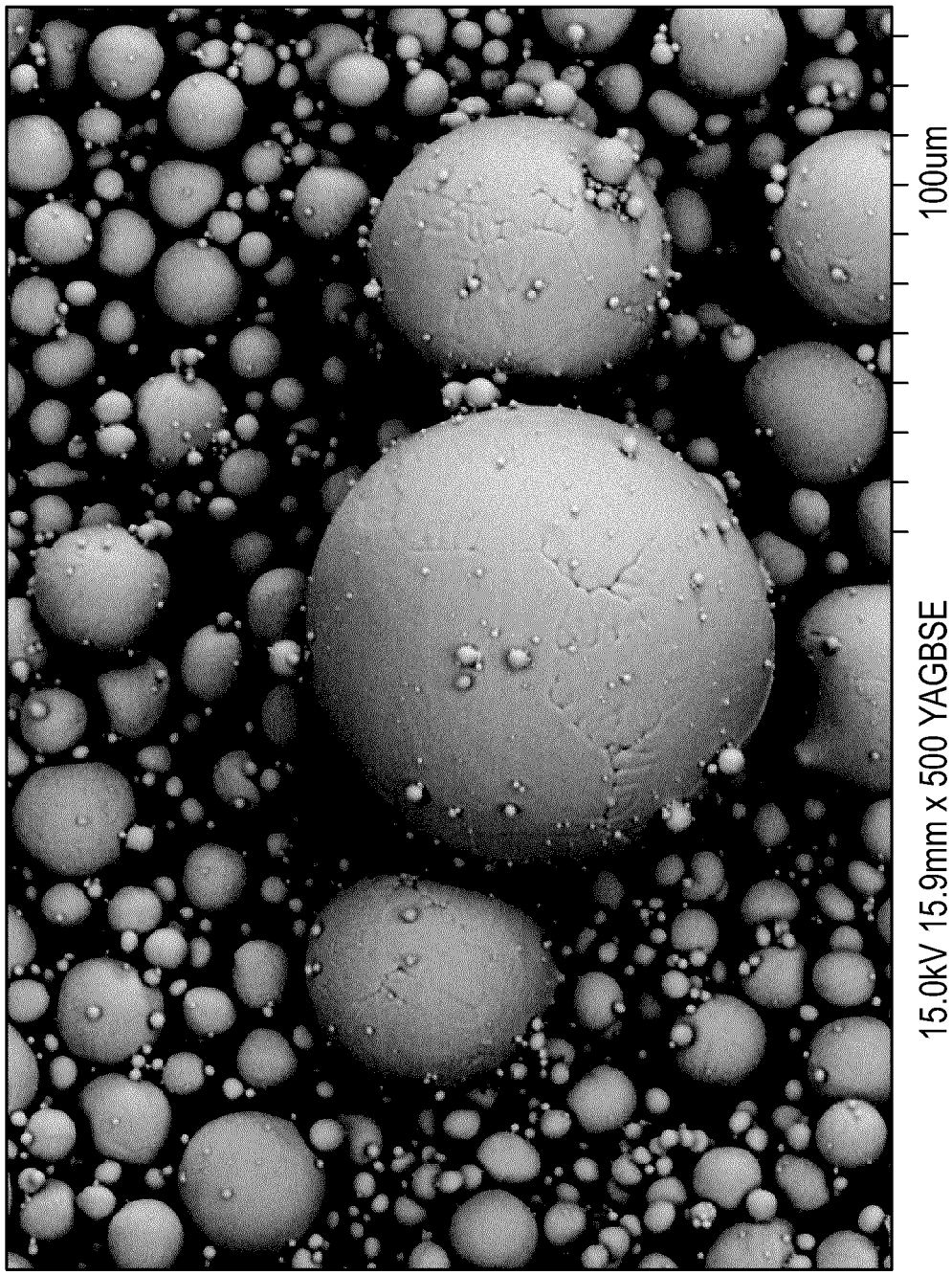
FIG. 10 is a SEM image at 500 times magnification of metal particles (Ti-6Al-4V) according to one example atomization process of the present disclosure.

FIG. 10 is a SEM image at 500 times magnification of the as-is raw metal powders formed (without sieving) within the example process.

Figure 11:
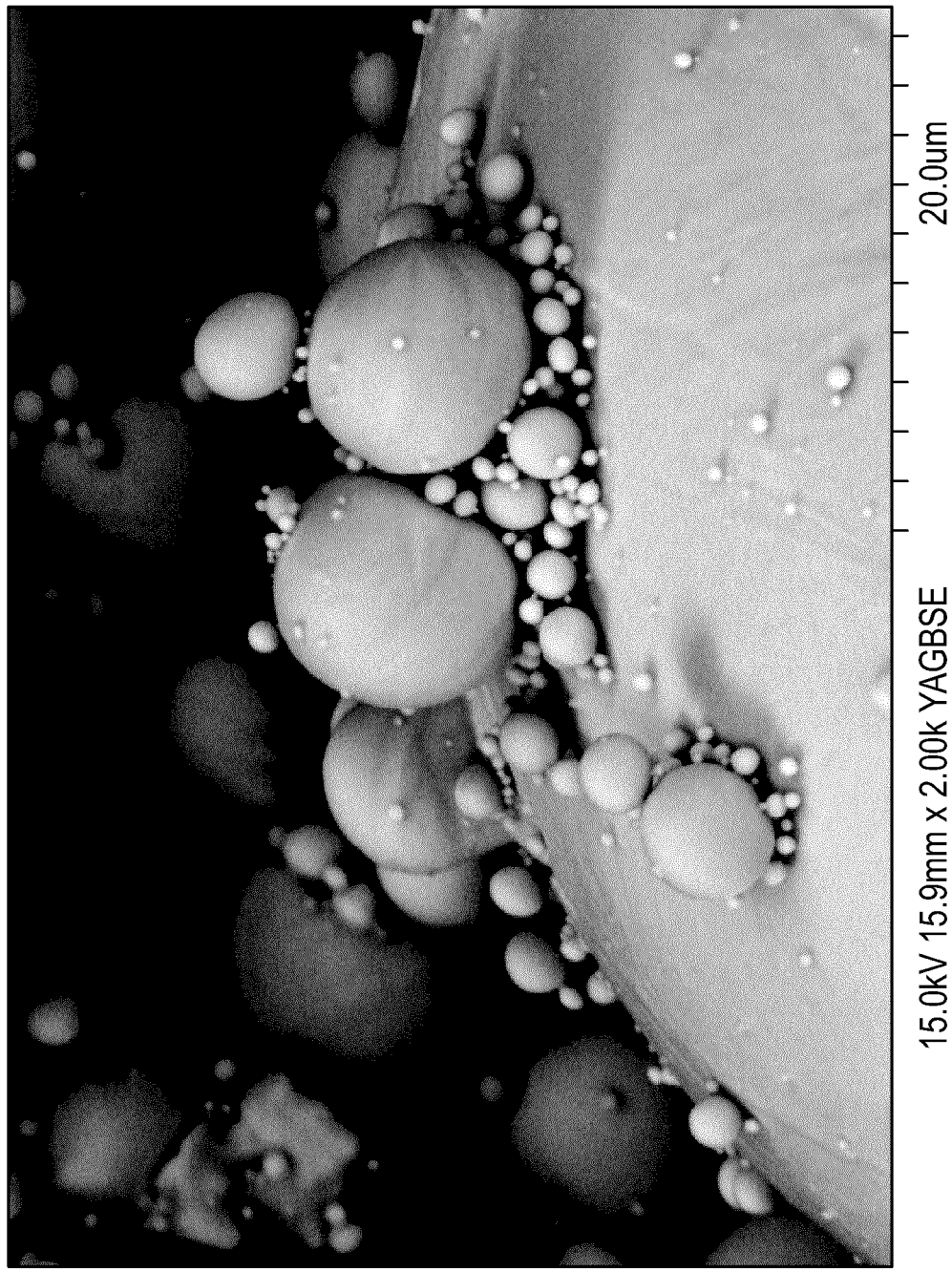
FIG. 11 is a SEM image at 2000 times magnification of metal particles (Ti-6Al-4V) according to one example atomization process of the present disclosure.

FIG. 11 is a SEM image at 2000 times magnification of as-is raw metal powders formed (without sieving) within the example process.

The presence of very fine particles (few μm in diameter) in FIGS. 9-11 is characteristic of a production of powder with more than 80% of yield of particle size ranging between 0 and 106 μm. These very fine particles possess weak physical bounds with the larger one.

Example 2—Ti-6Al-2Sn-4Zr-2Mo-0.08Si Atomization

A plasma atomization run is achieved using a 0.125" diameter wire of Ti-6Al-2Sn-4Zr-2Mo-0.08Si as raw material and 3 converging plasma jets oriented at about 30° with respect to the vertical axis. The plasma contacts the metal wire at a location that is within less than 2.0 centimeters of the plasma torch nozzle outlet. Each plasma torch is operated at a power of 30 kW with a 150 SLM argon gas flow.

A background sheath gas is also used to ensure proper transport of metal droplets. The sheath gas flow is at 550 SLM.

A dc electric current of 150 A at an electric potential of 45 V is used to preheat the wire at elevated temperature prior to the atomization with the plasma jets and it results in a wire feed rate of 8.5 kg/h.

The wire is fed through a gas cooled and adjustable guide to enable a continuous metal feeding right to the apex of the plasma torch jets. The batch size is typically of 100 kg for the run.

The gas to metal ratio in these production runs is thus about 12.6.

The particle size distribution obtained is determined according to ASTM B214.

The yield results is:

TABLE 3

| Sieve (μm) | % wt. |
|---|---|
| >180 | 0.8 |
| ≤180 > 125 | 4.3 |
| ≤125 > 106 | 3.9 |
| ≤106 > 75 | 14.8 |
| ≤75 > 53 | 21.1 |
| ≤53 > 45 | 11.5 |
| ≤45 > 25 | 27.3 |
| ≤25 | 16.3 |
| Total | 100 |
| 0-106 | 91.0 |
| 0-180 | 99.2 |
| 45-106 | 47.4 |
| 0-45 | 43.6 |

The typical chemical composition obtain for a Ti-6Al-2Sn-4Zr-2Mo-0.08Si powder is:

TABLE 4

POWDER COMPOSITION (weight percent)

| Element | Measured | Testing method |
|---|---|---|
| Aluminum, range | 6.18 | ASTM E 2371- Direct current plasma emission spectroscopy |
| Zirconium, range | 3.98 | ASTM E 2371- Direct current plasma emission spectroscopy |
| Molybdenum, range | 1.93 | ASTM E 2371- Direct current plasma emission spectroscopy |
| Tin, range | 2.07 | ASTM E 2371- Direct current plasma emission spectroscopy |
| Silicon, range | 0.08 | ASTM E 2371- Direct current plasma emission spectroscopy |
| Iron, max. | 0.22 | ASTM E 2371- Direct current plasma emission spectroscopy |
| Oxygen, max. | 0.11 | ASTM E1409 - Inert gas fusion |
| Carbon, max. | 0.02 | ASTM E1941 - Combustion infrared detection |
| Nitrogen, max. | 0.01 | ASTM E1409 - Inert gas fusion |
| Hydrogen, max. | 0.0013 | ASTM E 1447 - Inert gas fusion |
| Yttrium, max. | <0.001 | ASTM E 2371- Direct current plasma emission spectroscopy |
| Residual each, max. | <0.10 | ASTM E 2371- Direct current plasma emission spectroscopy |
| Residual total, max. | <0.30 | ASTM E 2371- Direct current plasma emission spectroscopy |
| Titanium | Remainder | ASTM E 2371- Direct current plasma emission spectroscopy |

Example 3—Zr Atomization

A plasma atomization run is achieved using a 0.080" diameter wire of zirconium as raw material and 3 converging plasma jets oriented at about 30° with respect to the vertical axis. The plasma contacts the metal wire at a location that is within less than 2.0 centimeters of the plasma torch nozzle outlet. Each plasma torch is operated at a power of 30 kW with a 150 SLM argon gas flow.

A background sheath gas is also used to ensure proper transport of metal droplets. The sheath gas flow is at 550 SLM.

A dc electric current of 115 A at an electric potential of 45 V is used to preheat the wire at elevated temperature prior to the atomization with the plasma jets and it results in a wire feed rate of 6.0 kg/h. The wire is fed through a gas cooled and adjustable guide to enable a continuous metal feeding right to the apex of the plasma torch jets. The batch size is typically of 50 kg for the run.

The gas to metal ratio in these production runs is thus about 17.8.

The particle size distribution obtained is determined according to ASTM B214.

The yield results is:

TABLE 5

| Sieves (μm) | % wt. |
|---|---|
| >180 | 1.8 |
| ≤180 > 125 | 2.1 |
| ≤125 > 106 | 1.8 |
| ≤106 > 75 | 9.9 |
| ≤75 > 53 | 19.7 |
| ≤53 > 45 | 12.3 |
| ≤45 > 25 | 30.9 |
| ≤25 | 21.5 |
| Total | 100.0 |
| 0-106 | 94.3 |
| 0-180 | 98.2 |
| 45-106 | 41.9 |
| 0-45 | 52.4 |

The typical chemical composition obtain for a zirconium powder is:

TABLE 6

| POWDER COMPOSITION (weight percent) | | |
|---|---|---|
| Element | Measured | Testing method |
| Tin, range | 1.61 | ASTM E1097 |
| Iron, range | 0.19 | ASTM E1097 |
| Chromium, range | 0.11 | ASTM E1097 |
| Oxygen | 0.151 | ASTM E1019 |
| Iron + chromium | 0.30 | ASTM E1097 |
| Aluminum, max | 0.0043 | ASTM E 1097 |
| Carbon, max | 0.009 | ASTM E1019 |
| Hafnium, max | <0.002 | ASTM E1097 |
| Hydrogen, max | 0.0011 | ASTM E 1447 |
| Niobium, max. | <0.002 | ASTM E1097 |
| Nitrogen, max | <0.005 | ASTM E1019 |
| Silicon, max | 0.0044 | ASTM E1097 |
| Tungsten, max | <0.002 | ASTM E1097 |
| Titanium, max | <0.0005 | ASTM E1097 |
| Zirconium | Remainder | |

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The invention claimed is:

1. A plasma atomization metal powder manufacturing process comprising:
aligning a heated metal source with a plasma of at least one plasma source, the aligning comprising positioning the heated metal source within at most 5 centimeters from an outlet nozzle of the at least one plasma source; and
contacting said heated metal source with the plasma of the at least one plasma source under conditions effective for causing plasma atomization of said heated metal source, wherein said plasma atomization is carried out by using a total gas to metal mass ratio of less than about 17, thereby obtaining a raw metal powder having a 0-106 μm particle size distribution yield of at least 80%, measured according to ASTM B214-07(2011);
wherein the heated metal source comprises at least one member chosen from titanium, titanium alloys, zirconium, zirconium alloys, cobalt superalloys, nickel superalloys, magnesium, magnesium alloys, niobium, niobium alloys, aluminum, aluminum alloys, molybdenum, molybdenum alloys, tungsten and tungsten alloys;
wherein the heated metal source is a wire, a rod, a melt stream, or a combination thereof.

2. The manufacturing process of claim 1, wherein the total gas to metal mass ratio is less than 17.

3. The manufacturing process of claim 1, wherein the total gas to metal mass ratio is about 5 to about 15.

4. The manufacturing process of claim 1, wherein the total gas to metal mass ratio is between 5 and 15.

5. The manufacturing process of claim 1, wherein the total gas to metal mass ratio is about 10 to about 15.

6. The manufacturing process of claim 1, wherein the raw metal powder has a 0-106 μm particle size distribution yield of at least 90%, measured according to ASTM B214-07 (2011).

7. The manufacturing process of claim 1, wherein the raw metal powder has a 0-75 μm particle size distribution yield of at least 85%, measured according to ASTM B214-07 (2011).

8. The manufacturing process of claim 1, wherein the raw metal powder has a 0-45 μm particle size distribution yield of at least 50%, measured according to ASTM B214-07 (2011).

9. The manufacturing process of claim 1, wherein aligning the heated metal source with the plasma of the at least one plasma source comprises positioning the heated metal source within at most 2.5 centimeters from the outlet nozzle of the at least one plasma source.

10. The manufacturing process of claim 1, wherein the plasma is emitted from a plurality of discrete nozzles of the at least one plasma source, the discrete nozzles being positioned angularly about the heated metal source.

11. The manufacturing process of claim 1, wherein the heated metal source is a wire.

12. The manufacturing process of claim 1, wherein said heated metal source is a wire heated by resistive heating, arc discharge, and induction heating, or a combination thereof.

13. The manufacturing process of claim 1, wherein said heated metal source is a melt stream.

14. The manufacturing process of claim 1, wherein the heated metal source comprises at least one member chosen from titanium, titanium alloys, zirconium, zirconium alloys, cob alt superalloys, nickel superalloys, magnesium, magnesium alloys, niobium, niobium alloys, molybdenum, molybdenum alloys, tungsten and tungsten alloys.

15. The manufacturing process of claim 1, wherein said heated metal source comprises titanium, zirconium, magnesium, aluminum, or a combination thereof.

16. The manufacturing process of claim 1, wherein said heated metal source is a titanium alloy.

17. The manufacturing process of claim 1, wherein said heated metal source is chosen from Ti-6Al-4V, Ti-6Al-2Sn-4Zr-2Mo, Ti-5Al-5V-5Mo-3Cr, and titanium aluminides.

18. The manufacturing process of claim 1, wherein aligning the heated metal source comprises adjusting an orientation of the heated metal source to maintain alignment of the heated metal source with the plasma of the at least one plasma source.

19. The manufacturing process of claim 1, wherein the aligning comprises adjusting an orientation of the heated metal source to maintain alignment of the heated metal source with the plasma of the at least one plasma source, the aligning further comprising moving the heated metal source to adjust the orientation.

20. The manufacturing process of claim 1, wherein the aligning comprises aligning, during the plasma atomization, the heated metal source by means of a guide member receiving the heated metal source therethrough, the aligning further comprising adjusting an orientation of the heated metal source to maintain alignment of the heated metal source with the plasma of the at least one plasma source by adjusting an orientation of the guide member with a displaceable member coupled thereto.

21. The manufacturing process of claim 1, wherein the aligning comprises adjusting an orientation of the heated metal source, wherein adjusting the orientation of the heated metal source comprises intermittently adjusting the orientation of the heated metal source to maintain alignment of the heated metal source with the plasma of the at least one plasma source.

22. A plasma atomization metal powder manufacturing process comprising:
aligning a heated metal source with a plasma of at least one plasma source, the aligning comprising adjusting an orientation of the heated metal source to maintain alignment of the heated metal source with the plasma of the at least one plasma source, the aligning further comprising moving the heated metal source to adjust the orientation; and
contacting said heated metal source with the plasma of the at least one plasma source under conditions effective for causing plasma atomization of said heated metal source, wherein said plasma atomization is carried out by using a total gas to metal mass ratio of less than about 20, thereby obtaining a raw metal powder having a 0-106 μm particle size distribution yield of at least 80%, measured according to ASTM B214-07(2011).

23. The manufacturing process of claim 22, wherein the total gas to metal mass ratio is less than 17.

24. The manufacturing process of claim 22, wherein the total gas to metal mass ratio is between 5 and 15.

25. The manufacturing process of claim 22, wherein the total gas to metal mass ratio is between 10 and 15.

26. The manufacturing process of claim 23, wherein the aligning comprises positioning the heated metal source within at most 5 centimeters from an outlet nozzle of the at least one plasma source.

27. The manufacturing process of claim 26, wherein the heated metal source comprises at least one member chosen from titanium, titanium alloys, zirconium, zirconium alloys, cobalt superalloys, nickel superalloys, magnesium, magnesium alloys, niobium, niobium alloys, aluminum, aluminum alloys, molybdenum, molybdenum alloys, tungsten and tungsten alloys.

28. The manufacturing process of claim 27, wherein the heated metal source is a wire, a rod, a melt stream, or a combination thereof.

29. The manufacturing process of claim 22, wherein the heated metal source is a wire.

30. The manufacturing process of claim 22, wherein said heated metal source is a wire heated by resistive heating, arc discharge, induction heating, or a combination thereof.

31. The manufacturing process of claim 22, wherein said heated metal source is a melt stream.

32. The manufacturing process of claim 22, wherein said heated metal source includes a titanium, a titanium alloy, or both.

33. The manufacturing process of claim 22, wherein said heated metal source is chosen from Ti-6Al-4V, Ti-6Al-2Sn-4Zr-2Mo, Ti-5Al-5V-5Mo-3Cr, and titanium aluminides.

34. The manufacturing process of claim 22, wherein the aligning comprises aligning, during the plasma atomization, the heated metal source by means of a guide member receiving the heated metal source therethrough, the aligning comprising adjusting the orientation of the heated metal source to maintain alignment of the heated metal source with the plasma of the at least one plasma source by adjusting an orientation of the guide member with a displaceable member coupled thereto.

35. The manufacturing process of claim 22, wherein the adjusting the orientation of the heated metal source comprises intermittently adjusting the orientation of the heated metal source to maintain alignment of the heated metal source with the plasma of the at least one plasma source.

* * * * *